United States Patent
Kim et al.

(10) Patent No.: US 9,942,697 B2
(45) Date of Patent: Apr. 10, 2018

(54) WIRELESS DATA INPUT AND OUTPUT METHOD AND APPARATUS

(71) Applicant: Samsung Electronics Co., Ltd., Suwon-si (KR)

(72) Inventors: Hyeong-Tae Kim, Seoul (KR); Jung-Sik Park, Suwon-si (KR); Woo-Sup Lee, Suwon-si (KR); Jae Ouk Chung, Seoul (KR); Seong-Min Ouk Kim, Seoul (KR); Youn-Ju Kim, Suwon-si (KR); Dong-Hun Park, Seoul (KR); Gun Lim, Anyang-si (KR); Jae-Woong Jeon, Suwon-si (KR); Hyun-Ju Hong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/941,482

(22) Filed: Nov. 13, 2015

(65) Prior Publication Data
US 2016/0142867 A1 May 19, 2016

(30) Foreign Application Priority Data
Nov. 14, 2014 (KR) .......................... 10-2014-0158845

(51) Int. Cl.
*H04W 4/00* (2009.01)
*H02J 7/02* (2016.01)
(Continued)

(52) U.S. Cl.
CPC ............ *H04W 4/008* (2013.01); *H02J 7/025* (2013.01); *H02J 7/04* (2013.01); *H02J 50/10* (2016.02);
(Continued)

(58) Field of Classification Search
CPC .......... H02J 7/025; H02J 7/04; H04W 4/008; H04W 76/023
See application file for complete search history.

(56) References Cited

U.S. PATENT DOCUMENTS 8,565,325 B1  10/2013  Banerjea
8,909,149 B2 *  12/2014  Briden ................ H04B 5/0031
                                                        455/41.2
(Continued)

FOREIGN PATENT DOCUMENTS

EP  2302882 A1  3/2011

OTHER PUBLICATIONS

Partial European Search Report dated Mar. 22, 2016 in connection with European Patent Application No. 15194370.1, 7 pages.
(Continued)

*Primary Examiner* — Lewis West

(57) ABSTRACT

An electronic device including a proximity recognition module configured to recognize second electronic device proximate to the first electronic device, a communication module configured to wirelessly transmit and receive data to and from the second electronic device, and a power supply module configured to apply at least one of power charged in the first electronic device and power wirelessly supplied from the second device as power for the communication module, based on the recognition with respect to the second device. Other embodiments are also possible.

14 Claims, 13 Drawing Sheets

(51) Int. Cl.
    *H02J 7/04*         (2006.01)
    *H04W 76/02*     (2009.01)
    *H04M 1/725*     (2006.01)
    *H02J 50/10*     (2016.01)

(52) U.S. Cl.
    CPC ....... *H04M 1/7253* (2013.01); *H04W 76/023* (2013.01); *H04M 2250/12* (2013.01)

(56) References Cited

U.S. PATENT DOCUMENTS

| | | |
|---|---|---|
| 2006/0079180 A1 | 4/2006 | Sinivaara |
| 2006/0178127 A1 | 8/2006 | Kawasaki |
| 2009/0061795 A1 | 3/2009 | Doan et al. |
| 2012/0112543 A1 | 5/2012 | van Wageningen et al. |
| 2012/0242294 A1* | 9/2012 | Muth ...................... H02J 17/00 320/137 |
| 2014/0170972 A1* | 6/2014 | Suzuki ................. H04B 5/0031 455/41.1 |
| 2014/0235169 A1* | 8/2014 | Parkinson ............. H04W 4/008 455/41.2 |

OTHER PUBLICATIONS

Extended European Search Report dated Jul. 6, 2016 in connection with European Patent Application No. 15194370.1, 12 pages.

\* cited by examiner

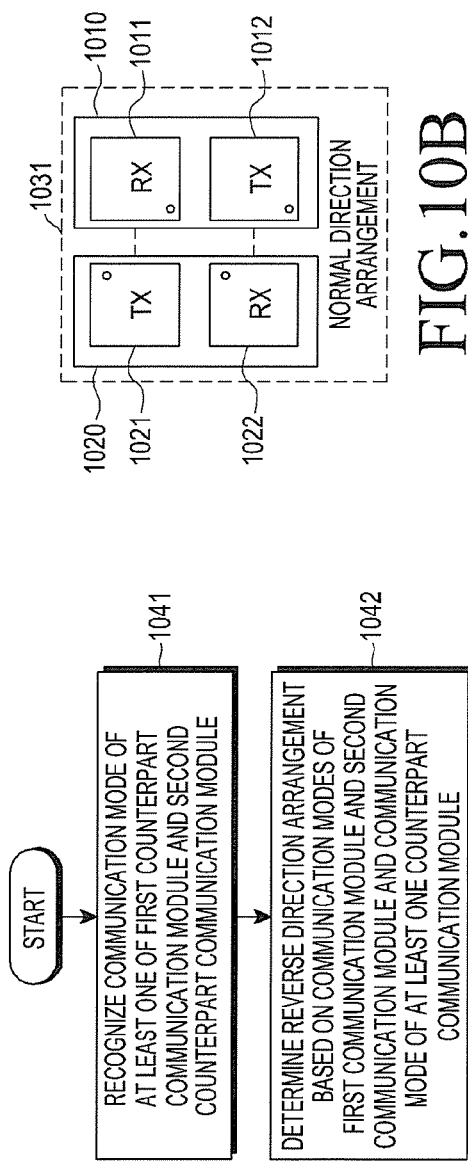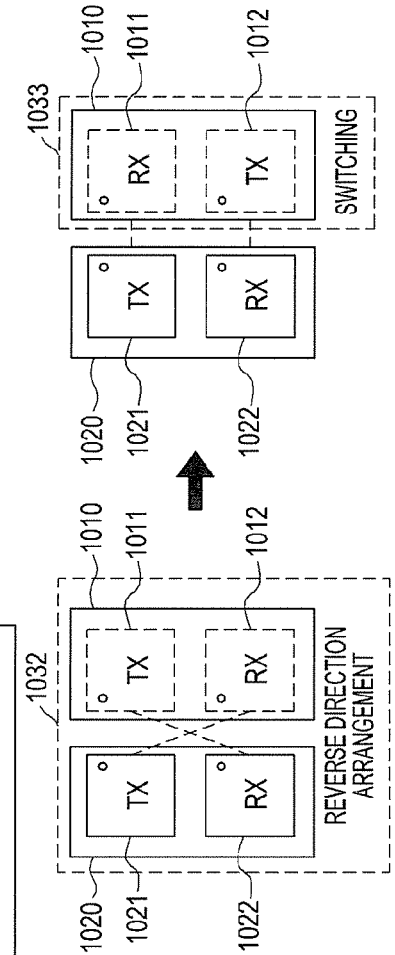
FIG.10A FIG.10B FIG.10C

WIRELESS DATA INPUT AND OUTPUT METHOD AND APPARATUS

CROSS-REFERENCE TO RELATED APPLICATION(S) AND CLAIM OF PRIORITY

The present application is related to and claims priority from and benefit under 35 U.S.C. § 119(a) of a Korean patent application filed in the Korean Intellectual Property Office on Nov. 14, 2014 and assigned Serial No. 10-2014-0158845, the entire disclosure of which is incorporated herein by reference.

TECHNICAL FIELD

Various embodiments of the present disclosure relate generally to a method and apparatus for wirelessly inputting and outputting data between electronic devices.

BACKGROUND

Generally, a plurality of electronic devices is connected with various types of input/output (I/O) interfaces to exchange and share various kinds of data stored therein, for example, user data, contents, or applications. A technique for inputting and outputting data between electronic devices is applicable to heterogeneous electronic devices as well as homogeneous electronic devices. For example, data stored in the heterogeneous electronic devices can be transmitted and received, or shared through I/O interface between a smartphone and a laptop personal computer (PC), between a smartphone and a desktop PC, between a smartphone and a tablet PC, between a smartphone and an accessory, or between a smartphone and a home appliance.

As a communication standard related to data I/O between electronic devices, a universal serial bus (USB) may be used. An electronic device may include a USB connector as an I/O interface for inputting and outputting data based on the USB communication standard. The USB connector includes at least four pins, for example, a power pin (such as such as VBUS) for receiving a power of about 5V for USB connection from an external device (such as such as a host), a ground pin GND, and at least two data pins (such as such as D+, D−) for delivering data through signals having cross phases. The pins of the USB connector may be formed in a hole exposed on an outer surface of an electronic device so as to be physically coupled with a connector formed in an external device or with a cable for connection with the external device.

If at least a part of an I/O interface is formed to be connected with an external device through a hole exposed on an outer surface of an electronic device (such as, a USB connector), the electronic device can be designed to have a complicated exterior structure due to the interface hole and some circuits related to the I/O interface may be exposed to an external environment through the interface hole, resulting in a structure having limited safety against the external environment, for example, having vulnerabilities to water, dust, or other foreign substances. Moreover, users may experience the inconvenience of connecting an external device to fit for such a structure of the electronic device.

Meanwhile, the electronic device can input and output data through wireless communication protocols. When the electronic device inputs and outputs data using wireless communication protocols, data speed of an I/O interface may be limited or efficiency of an I/O efficiency may be degraded due to extra power consumption for continuously sensing radio frequency (RF) signals in a wireless communication circuit.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide, for use in an electronic device which has a structure being robust against an external environment change while being simple and which is configured to input and output data at a high data rate and to efficiently manage power consumption for data input and output.

In one example, a method is provided. The method includes recognizing second electronic device proximate to an first electronic device, applying at least one of power charged in the first electronic device and power wirelessly supplied from the second electronic device as power for communication with the second electronic device in accordance with the recognition of the second electronic device, and wirelessly transmitting and receiving data to and from the second electronic device based on the applied power.

In another example, a method is provided. The method includes recognizing a second electronic device proximate to an first electronic device, wirelessly connecting a first communication module connected to the first electronic device to the second electronic device in one selected from a plurality of communication modes comprising a transmission mode and a reception mode, and wirelessly connecting a second communication module connected to the first electronic device to the second electronic device that is selected from the plurality of communication modes.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A, 10B and 10C illustrates an example flowchart for determining a communication mode of an electronic device according to various embodiments of the present disclosure;

Throughout the drawings, like reference numerals will be understood to refer to like parts, components, and structures.

DETAILED DESCRIPTION

Figure 1:
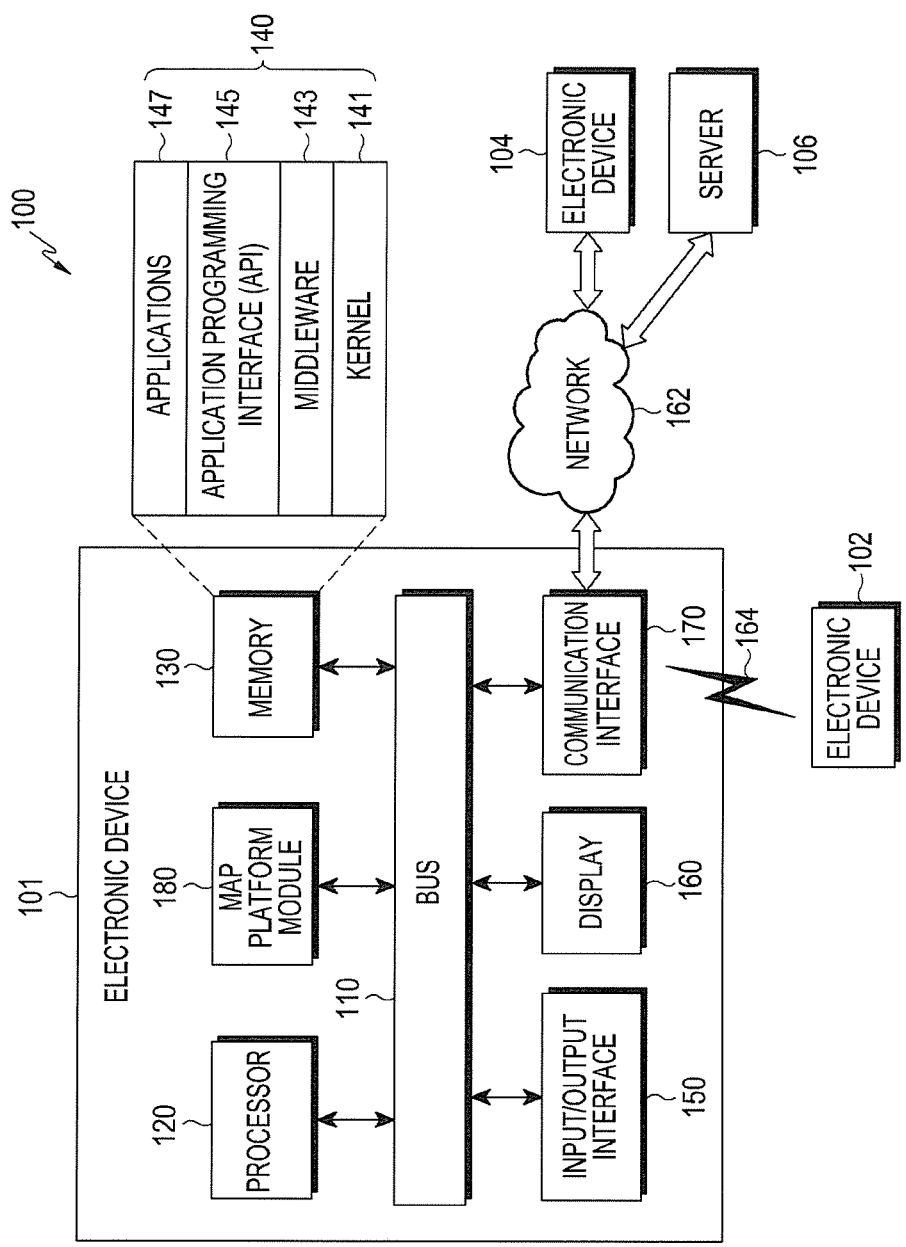
FIG. 1 illustrates an example network environment system according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various exemplary embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used for only describing a specific exemplary embodiment and may not have an intention to limit the scope of other exemplary embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present exemplary embodiments.

An electronic device according to various embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, mobile medical equipment, a camera, and a wearable device. In certain embodiments, the wearable device may include at least one of an accessory type (such as a watch, a bracelet, an anklet, a necklace, glasses, a contact lens, or head-mounted device (HMD)), a fabric or clothing-integrated type (such as an electronic cloth), a body-attached type (such as a skin pad or tattoo), and a body-implanted type (such as an implantable circuit).

In certain embodiments, the electronic device may be a home appliance. The home appliance may include, for example, at least one of a television (TV), a digital video disk (DVD) player, audio equipment, a refrigerator, an air conditioner, a vacuum cleaner, an oven, a microwave oven, a washing machine, an air cleaner, a set-top box, a home automation control panel, a security control panel, a TV box (such as SAMSUNG HOMESYNC™, APPLE TV™, GOOGLETV™ or the like), a game console (such as Xbox™ or PlayStation™), an electronic dictionary, an electronic key, a camcorder, and an electronic frame.

In certain embodiments, the electronic device may include at least one of various medical equipment (such as various portable medical measurement systems, such as a blood sugar measurement device, a heartbeat measurement device, a blood pressure measurement device, or a body temperature measurement device, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (such as navigation system and gyro compass for ships), avionics, a security device, a vehicle head unit, an industrial or home robot, an automatic teller's machine (ATM), a point of sales (POS), Internet of things (such as electric bulbs, various sensors, electricity or gas meters, sprinkler devices, fire alarm devices, thermostats, streetlights, toasters, exercise machines, hot-water tanks, heaters, boilers, etc.).

In certain embodiments, the electronic device may include a part of a furniture or building/structure, an electronic board, an electronic signature receiving device, a projector, and various measuring instruments (such as a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (such as an artificial intelligence electronic device).

As illustrated in FIG. 1, a description is made of an electronic device 101 in a network environment 100 according to various embodiments of the present disclosure. The electronic device 101 includes a bus 110, a processor 120, a memory 130, an I/O interface 150, a display 160, a communication interface 170, and an I/O control module 180.

According to some embodiments, the electronic device 101 can omit at least one of the foregoing elements or can further include other elements.

The bus 110 includes a circuit for interconnecting the elements 120 through 180 described above and for allowing communication (such as a control message and/or data) between the elements 120 through 180.

The processor 120 includes one or more of a central processing unit (CPU), an application processor (AP), and a communication processor (CP). The processor 120 performs operations or data processing for control and/or communication of, for example, at least one other elements of the electronic device 101.

The memory 130 includes a volatile and/or nonvolatile memory. The memory 130 stores, for example, commands or data associated with at least one other elements of the electronic device 101. In certain embodiments, the memory 130 stores software and/or a program 140. The program 140 includes, for example, a kernel 141, middleware 143, an Application Programming Interface (API) 145, and/or an application program (or an application) 147. At least some of the kernel 141, the middleware 143, and the API 145 are referred to as an operating system (OS).

The kernel 141 controls or manages, for example, system resources (such as the bus 110, the processor 120, or the memory 130) used to execute an operation or a function implemented in other programs (such as the middleware 143, the API 145, or the application program 147). The kernel 141 provides an interface through that the middleware 143, the API 145, or the application program 147 accesses separate components of the electronic device 101 to control or manage the system resources.

The middleware 143 works as an intermediary for allowing, for example, the API 145 or the application program 147 to exchange data in communication with the kernel 141.

In regard to one or more task requests received from the application program 147, the middleware 143 processes them according to priorities. For example, the middleware 143 gives priorities for using a system resource (such as the bus 110, the processor 120, or the memory 130) of the electronic device 101 to at least one of the application programs 147. In more details, the middleware 143 performs a scheduling or a load balancing with respect to the one or more task requests by processing the one or more task requests according to a priority given to the at least one application program 147.

The API 145 is an interface used for the application 147 to control a function provided by the kernel 141 or the middleware 143, and includes, for example, at least one interface or function (such as a command) for file control, window control, image processing or character control.

The I/O interface 150 serves as an interface for delivering a command or data input from a user or another external device to other element(s) 110 through 190 of the electronic device 101. The I/O interface 150 also outputs a command or data received from other element(s) 110 through 190 of the electronic device 101 to a user or another external device.

The display 160 includes, for example, a liquid crystal display (LCD), a light emitting diode (LED) display, an organic light emitting diode (OLED) display, a micro electro mechanical system (MEMS) display, or an electronic paper display. The display 160 displays various contents (such as a text, an image, video, an icon, or a symbol) to users. The display 160 includes a touch screen, and receives a touch, a gesture, proximity, or a hovering input, for example, by using an electronic pen or a part of a body of a user.

The communication interface 170 sets up communication, for example, between the electronic device 101 and an external device (such as a first external electronic device 102, a second external electronic device 104, or a server 106). For example, the communication interface 170 is connected to a network 162 through wireless or wired communication protocol to communicate with the external device (such as the second external electronic device 104 or the server 106).

The wireless communication may use, as a cellular communication protocol, for example, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)). The wireless communication may include, for example, short-range communication 164. The short-range communication 164 may include, for example, at least one of wireless-fidelity (Wi-Fi), Bluetooth, near field communication (NFC), and a global positioning system (GPS). The wired communication may include, for example, at least one of a universal serial bus (USB), a high definition multimedia interface (HDMI), a recommended standard (RS)-232, and a plain old telephone service (POTS). The network 162 includes a telecommunications network, for example, at least one of a computer network (such as a local area network (LAN) or a wide area network (WAN)), Internet, and a telephone network.

The I/O control module 180 controls, for example, an I/O function of the electronic device 101 or an element for performing the I/O function, such as the I/O interface 150 or the communication interface 170. At least a part of the I/O control module 180 is implemented by at least one command stored in the memory 130 and configured to cause at least one processor to perform a control operation when executed by the processor 120. Additionally or alternatively, at least a part of the I/O control module 180 is implemented with a hardware circuit for performing the control operation. Although the I/O control module 180 is illustrated as elements independent of the processor 120 and the memory 130 in FIG. 1, various embodiments are not limited to this illustration. At least some of the I/O control module 180 are integrated with, for example, the processor 120, or stored in the memory 130 in the form of software and executed in the processor 120. The I/O control module 180 is implemented in a manner distributed over the processor 120 and the memory 130. Additional information regarding the I/O control module 180 is provided in association with FIG. 4.

At least one of the first external electronic device 102 and the second external electronic device 104 are a device of the same type as or a different type than the electronic device 101. In certain embodiments, the server 106 includes a group of one or more servers. According to various embodiments, all or some of operations performed in the electronic device 101 are performed in another electronic device or a plurality of electronic devices (such as the electronic devices 102 and 104 or the server 106). In certain embodiments, when the electronic device 101 has to perform a function or a service automatically or at the request, the electronic device 101 requests another device (such as the electronic devices 102 and 104 or the server 106) to perform at least some functions associated with the function or the service instead of or in addition to executing the function or the service. Another electronic device (such as the electronic devices 102 and 104 or the server 106) performs the requested function or an additional function and delivers the result to the electronic device 101. The electronic device 101 provides the received result or provides the requested function or service by processing the received result. To this end, for example, cloud computing, distributed computing, or client-server computing is used.

Figure 2:
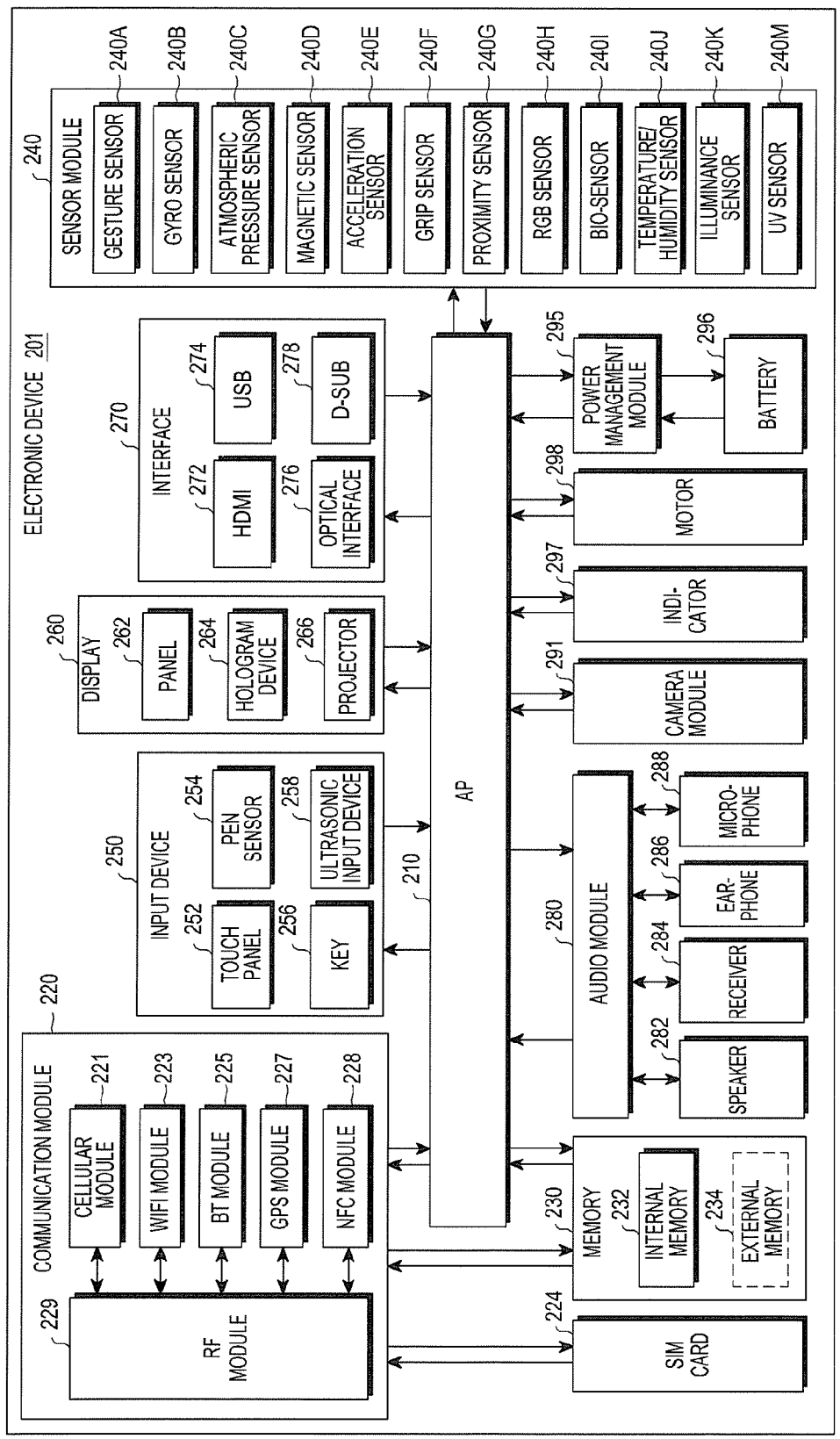
FIG. 2 illustrates an example block diagram of an electronic device according to various embodiments of the present disclosure.

FIG. 2 illustrates an example block diagram of an electronic device 201 according to various embodiments of the present disclosure.

As illustrated in FIG. 2, an electronic device 201 forms the entire electronic device 101 illustrated in FIG. 1 or a part of the electronic device 101 illustrated in FIG. 1. The electronic device 201 includes one or more application processors (APs) 210, a communication module 220, a subscriber identification module (SIM) module 224, a memory 230, a sensor module 240, an input module 250, a display 260, an interface 270, an audio module 280, a camera module 291, a power management module 295, a battery 296, an indicator 297, and a motor 298.

The processor 210 controls multiple hardware or software components connected to the processor 210 by driving an operating system (OS) or an application program, and performs processing and operations with respect to various data including multimedia data. The processor 210 is implemented with, for example, a system on chip (SoC). According to an embodiment, the processor 210 further includes a graphic processing unit (GPU) and/or an image signal processor. The processor 210 includes at least some of the elements illustrated in FIG. 2 (such as the cellular module 221). The processor 210 loads a command or data received from at least one of other elements (such as a non-volatile memory) into a volatile memory and processes the command or data and stores various data in the non-volatile memory.

The communication module 220 has a configuration that is the same as or similar to the communication interface 170 illustrated in FIG. 1. The communication module 220 includes, for example, the cellular module 221, a WiFi module 223, a Bluetooth (BT) module 225, a global positioning system (GPS) module 227, a near field communication (NFC) module 228, and a radio frequency (RF) module 229.

The cellular module 221 provides, for example, a voice call, a video call, a text service, or an Internet service over a communication network. According to an embodiment, the cellular module 221 identifies and authenticates the electronic device 201 in a communication network by using a subscriber identification module (such as the SIM module 224). According to an embodiment, the cellular module 221 performs at least one of functions that are provided by the processor 210. According to an embodiment, the cellular module 221 includes a communication processor (CP).

At least one of the WiFi module 223, the BT module 225, the GPS module 227, and the NFC module 228 include a processor for processing data transmitted and received by a corresponding module. According to some embodiment, at least some (such as two or more) of the cellular module 221, the WiFi module 223, the BT module 225, the GPS module 227, and the NFC module 228 are included in one integrated chip (IC) or IC package.

The RF module 229 transmits and receives a communication signal (such as an RF signal). The RF module 229 includes a transceiver, a power amp module (PAM), a frequency filter, a low noise amplifier (LNA), or an antenna. According to another embodiment, at least one of the cellular module 221, the WiFi module 223, the BT module 225, the GPS module 227, and the NFC module 228 transmit and receive an RF signal through a separate RF module.

The SIM module 224 includes a card including an SIM and/or an embedded SIM, and includes unique identification information (such as an integrated circuit card identifier (ICCID) or subscriber information (such as an international mobile subscriber identity (IMSI)).

The memory 230 (such as the memory 130) includes an internal memory 232 or an external memory 234. The internal memory 232 includes at least one of a volatile memory (such as dynamic random access memory (DRAM), static RAM (SRAM), synchronous dynamic RAM (SDRAM), and a non-volatile memory (such as one time programmable read only memory (OTPROM), programmable ROM (PROM), erasable and programmable ROM (EPROM), electrically erasable and programmable ROM (EEPROM), mask ROM, flash ROM, NAND flash memory, or NOR flash memory), and a solid state drive (SSD).

The external memory 234 further includes flash drive, for example, compact flash (CF), secure digital (SD), micro-SD, mini-SD, extreme Digital (xD), a MultiMedia Card (MMC), or a memory stick. The external memory 234 is functionally and/or physically connected with the electronic device 201 through various interfaces.

The sensor module 240 measures physical quantity or senses an operation state of the electronic device 201 to convert the measured or sensed information into an electric signal. The sensor module 240 includes at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (such as RGB sensor), a biometric sensor 240I, a temperature/humidity sensor 240J, an illumination sensor 240K, and a ultraviolet (UV) sensor 240M. Additionally or alternatively, the sensor module 240 includes an e-nose sensor (not shown), an electromyography (EMG) sensor (not shown), an electroencephalogram (EEG) sensor (not shown), an electrocardiogram (ECG) sensor (not shown), or a fingerprint sensor. The sensor module 240 further includes a control circuit for controlling at least one sensor included therein. In some embodiments, the electronic device 201 further includes a processor configured to control the sensor module 240 as part of or separately from the processor 210, to control the sensor module 240 during a sleep state of the processor 210.

The input module 250 includes a touch panel 252, a (digital) pen sensor 254, a key 256, or an ultrasonic input device 258. The touch panel 252 uses at least one of a capacitive type, a resistive type, an IR type, or an ultrasonic type. The touch panel 252 further includes a control circuit. The touch panel 252 further includes a tactile layer to provide tactile reaction to the user.

The (digital) pen sensor 254 includes a recognition sheet which is a part of the touch panel 252 or a separate recognition sheet. The key 256 also includes a physical button, an optical key, or a keypad. The ultrasonic input device 258 senses ultrasonic waves generated in an input means through a microphone (such as the microphone 288) and checks data corresponding to the sensed ultrasonic waves.

The display 260 (such as the display 160) includes a panel 262, a hologram 264, or a projector 266. The panel 262 has a configuration that is the same as or similar to that of the display 260 of FIG. 1. The panel 262 is implemented to be flexible, transparent, or wearable. The panel 262 is configured with the touch panel 252 in one module. The hologram 264 shows a stereoscopic image in the air by using interference of light. The projector 266 displays an image onto an external screen through projection of light. The screen is positioned inside or outside the electronic device 201. According to an embodiment, the display 260 further includes a control circuit for controlling the panel 262, the hologram 264, or the projector 266.

The interface 270 includes a high-definition multimedia interface (HDMI) 272, a universal serial bus (USB) 274, an optical communication 276, or a D-subminiature 278. The interface 270 is included in the communication interface 170 illustrated in FIG. 1. Additionally or alternatively, the interface 270 includes a mobile high-definition link (MHL) interface, an SD/MMC interface, or an infrared data association (IrDA) interface.

The audio module 280 bi-directionally converts sound and an electric signal. At least one element of the audio module 280 is included in the I/O interface 145 illustrated in FIG. 1. The audio module 280 processes sound information input or output through the speaker 282, the receiver 284, the earphone 286, or the microphone 288.

The camera module 291 is a device capable of capturing a still image or a moving image, and according to an embodiment, includes one or more image sensors (such as a front sensor or a rear sensor), a lens, an image signal processor (ISP), or a flash (such as an LED or a xenon lamp).

The power management module 295 manages power of the electronic device 201. According to an embodiment, the power management module 295 includes a power management integrated circuit (PMIC), a charger IC, or a battery fuel gauge. The PMIC has a wired and/or wireless charging technique. The wireless charging technique includes a magnetic-resonance type, a magnetic induction type, and an electromagnetic type, and for wireless charging, an additional circuit, for example, a coil loop, a resonance circuit, or a rectifier is further included. The battery gauge measures the remaining capacity of the battery 296 or the voltage, current, or temperature of the battery 296 during charging. The battery 296 includes a rechargeable battery and/or a solar battery.

The indicator 297 displays a particular state, for example, a booting state, a message state, or a charging state, of the electronic device 201 or a part thereof (such as the processor 210). The motor 298 converts an electric signal into mechanical vibration or generates vibration or a haptic effect. Although not shown, the electronic device 201 includes a processing device (such as a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements described herein may include one or more components, and a name of the part may vary with a type of the electronic device 201. The electronic device according to the present disclosure may include at least one of the foregoing elements, and some of the elements may be omitted therefrom or other elements may be further included therein. As some of the elements of the electronic device according to the present disclosure are coupled into one entity, thereby performing the same function as those of the elements that have not been coupled.

Figure 3:
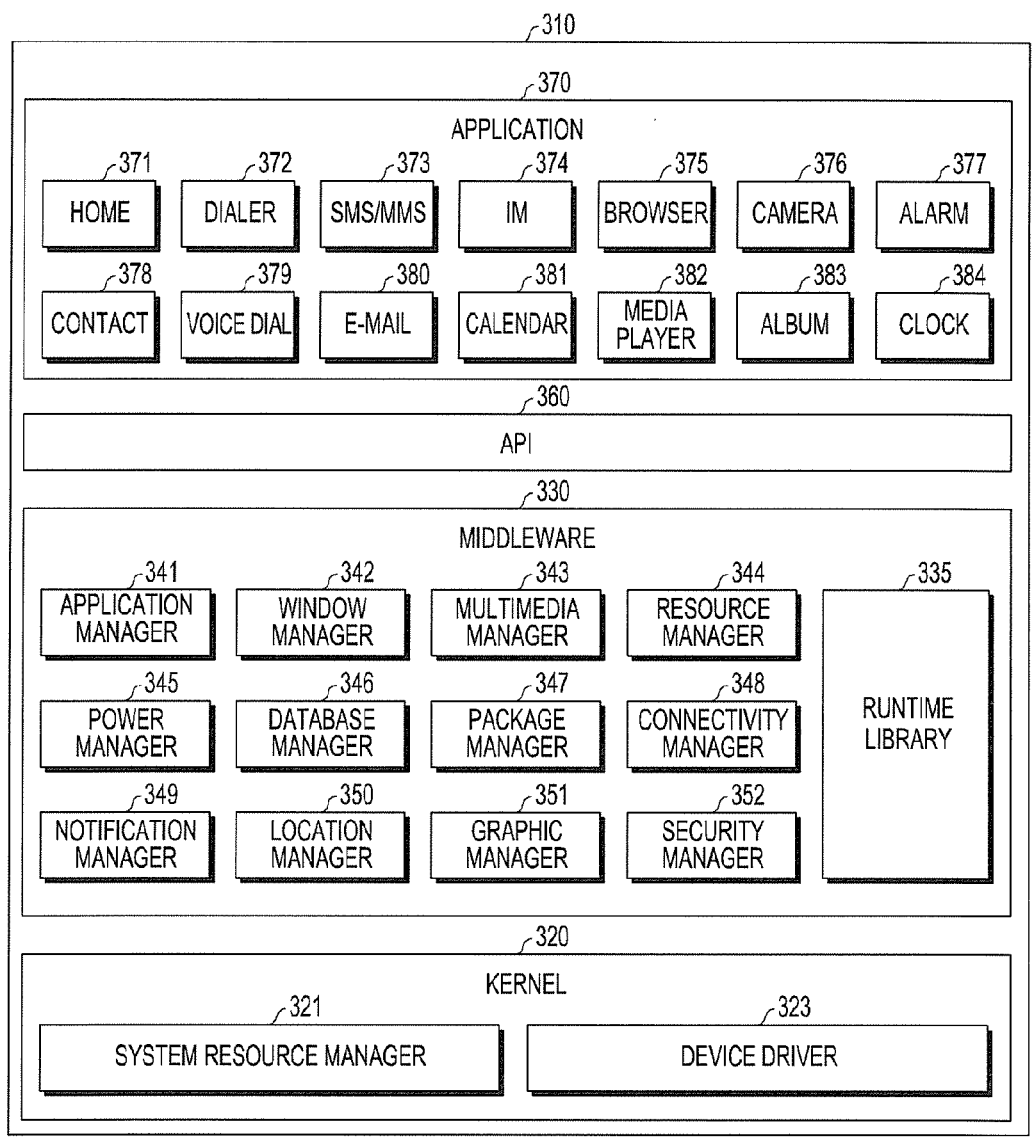
FIG. 3 illustrates an example a block diagram of a programming module according to various embodiments of the present disclosure.

FIG. 3 illustrates an example block diagram of a programming module 310 according to various embodiments of the present disclosure. According to an embodiment, a programming module 310 (such as the program 140) includes an OS for controlling resources associated with an electronic device (such as the electronic device 101) and/or various applications executed on the OS. The OS includes Android, iOS, Windows, Symbian, Tizen, or Bada.

The programming module 310 includes a kernel 320, a middleware 330, an application programming interface (API) 360, and/or an application 370. At least a part of the programming module 310 is preloaded on an electronic device or downloaded from an external electronic device (such as the electronic devices 102 and 104, or the server 106).

The kernel 320 (such as the kernel 141) includes a system resource manager and/or a device driver 323. The system resource manager 321 performs control, allocation, or retrieval of system resources. According to an embodiment, the system resource manager 321 includes a process management unit, a memory management unit, or a file system. The device driver 323 includes, for example, a display driver, a camera driver, a Bluetooth driver, a shared memory driver, a USB driver, a keypad driver, a WiFi driver, an audio driver, or an inter-process communication (IPC) driver.

The middleware 330 provides functions for the application 370 to commonly require or provide various functions to the application 370 through the API 360. In addition, the middleware 330 provides functions for the application 370 to efficiently use a limited system resource in an electronic device. In certain embodiments, the middleware 330 (such as the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library module that a compiler uses to add a new function through a programming language while the application 370 is executed. The runtime library 335 performs functions relating to an I/O, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface (UI) related thereto. The security manager 352 provides a general security function necessary for system security or user authentication. In certain embodiments, when an electronic device (such as the electronic device 101) has a call function, the middleware 330 furthers include a telephony manager for managing a voice or video call function of the electronic device.

The middleware 330 includes a middleware module forming a combination of various functions of the above-mentioned internal elements. The middleware 330 provides modules specified according to types of OS so as to provide distinctive functions. Additionally, the middleware 330 deletes some of existing elements or add new elements dynamically.

The API 360 (such as the API 145) is provided as a set of API programming functions with a different configuration according to the OS. In the case of Android or iOS, for example, a set of APIs is provided by each platform, and in the case of Tizen, two or more sets of API are be provided.

The application 370 (such as the application program 147) includes one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (such as an application for measuring an exercise amount or a blood sugar), or an environment information providing application (such as an application for providing air pressure, humidity, or temperature information).

In certain embodiments, the application 370 includes an application (hereinafter, an "information exchange application" for convenience) supporting information exchange between the electronic device (such as the electronic device 101) and an external electronic device (such as the electronic device 102 or 104). The information exchange application includes, for example, a notification relay application for transferring specific information to the external electronic device or a device management application for managing the external electronic device.

For example, the notification relay application includes a function for transferring notification information generated in another application (such as an SMS/MMS application, an e-mail application, a health care application, or an environment information application) of the electronic device to an external electronic device (such as the electronic device 102 or 104). The notification relay application receives notification information from an external electronic device to provide the same to a user. The device management application manages (such as install, remove, or update) at least one function (such as turn on/turn off of an external electronic device itself (or a part thereof) or control of brightness (or resolution) of a display, a service provided by an application operating in an external electronic device or provided by the external electronic device (such as a call service or a message service).

In certain embodiments, the application 370 includes an application (such as a health care application of mobile medical equipment) designated according to an attribute of the external electronic device (such as the electronic device 102 or 104). In certain embodiments, the application 370 includes an application received from the external electronic device (such as the server 106 or the electronic device 102 or 104). In certain embodiments, the application 370 includes a preloaded application or a third party application that is downloaded from the server. Names of elements of the programming module 310 according to the illustrated embodiment may vary depending on a type of an OS.

In certain embodiments, at least a part of the programming module 310 is implemented by software, firmware, hardware, or a combination of at least two of them. The at least a part of the programming module 310 is implemented (such as executed) by a processor (such as the processor 210). The at least a part of the programming module 310 includes a module, a program, a routine, sets or instructions, or a process for performing one or more functions.

A term "module" used herein may mean, for example, a unit including one of or a combination of two or more of hardware, software, and firmware. The "module" may be interchangeably used with a unit, logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of a device (such as, modules or functions thereof) or a method (such as, operations) according to various embodiments of the present disclosure may be implemented with a command stored in a computer-readable storage medium in the form of a program module. When the command is executed by a processor (such as, the processor 120), the one or more processors may perform a function corresponding to the command. The computer-readable storage medium may be, for example, the memory 130.

The computer readable recording medium includes magnetic media such as hard disk, floppy disk, or magnetic tape, optical media such as compact disc read only memory (CD-ROM) or digital versatile disc (DVD), magneto-optical media such as floptical disk, and a hardware device such as ROM, RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations. The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

Figure 4:
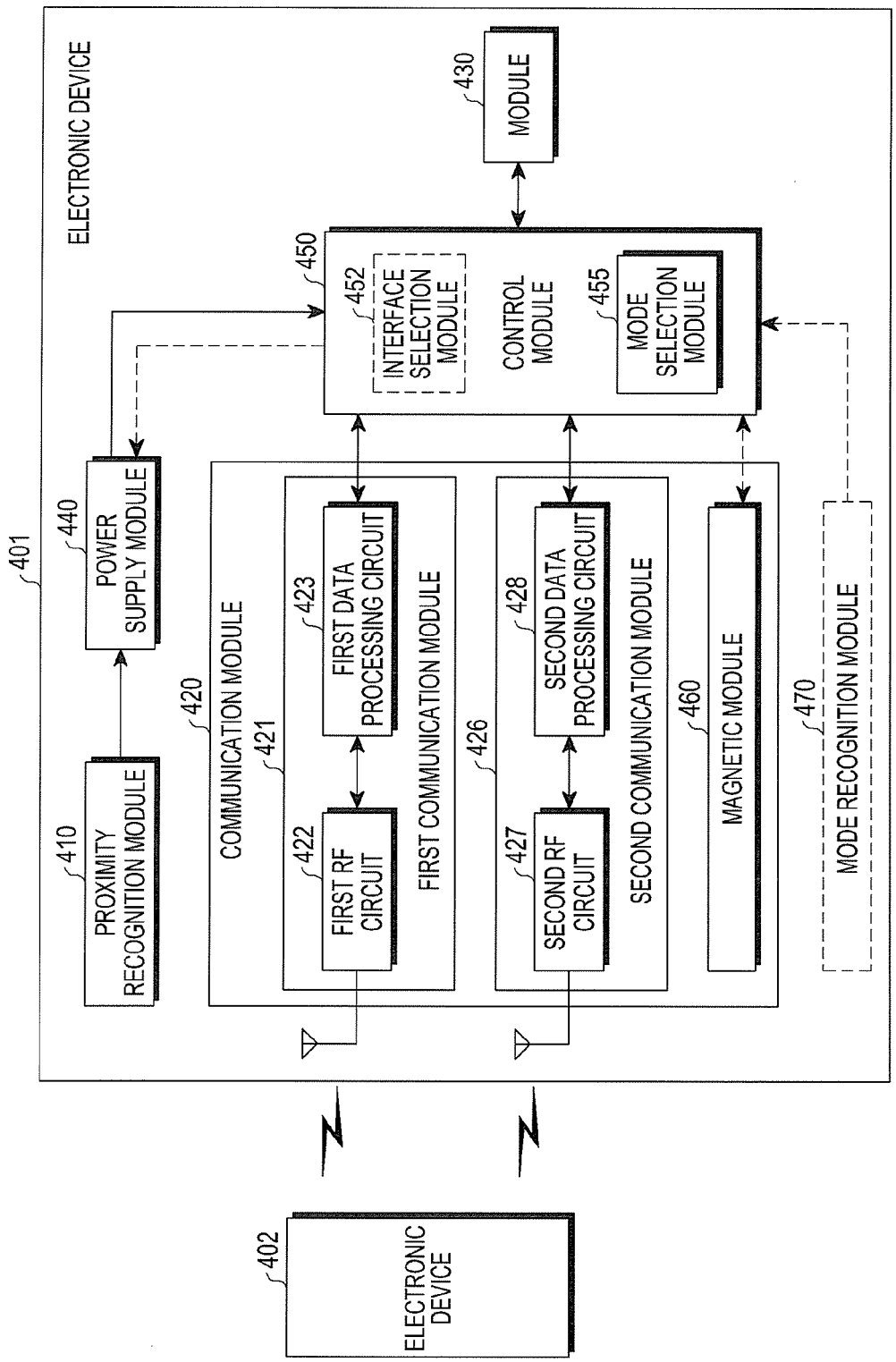
FIG. 4 illustrates another example block diagram of an electronic device according to various embodiments of the present disclosure.

FIG. 4 illustrates an example block diagram of an electronic device 401 according to various embodiments of the present disclosure.

As illustrated in FIG. 4, an electronic device 401 (such as the electronic device 101) includes a proximity recognition module 410, a communication module 420, a memory 430, a power supply module 440, and a control module 450.

The proximity recognition module 410 recognizes another electronic device 402 in proximity to the electronic device 401 within a predetermined distance (such as about 10 cm). The proximity recognition module 410 senses proximity to another electronic device 402 or obtains identification information of the proximate electronic device 402, for example, an identifier (ID), a name (such as a device name), or an address (such as a medium access control (MAC) address). In certain embodiments, at least a part of the proximity recognition module 410 is implemented by a combination of one or more of a short-range wireless communication module (such as the NFC module 228) or a sensor module (such as the sensor module 240).

The short-range wireless communication module (such as the NFC module 228) for proximity recognition obtains identification information of a counterpart electronic device (such as the electronic device 402) entering within a wireless communication range of the electronic device 401 through short-range wireless communication (such as NFC). The wireless communication range of short-range wireless communication is set variously according to a communication standard or protocol. In certain embodiments, short-range wireless communication is a communication protocol supporting the electronic device 401 to recognize a counterpart electronic device (such as the electronic device 402) proximate to the electronic device 401 through a simple operation, such as tagging, of the electronic device 401 or sensing by the electronic device 401 without separate authentication, for reception of specific information stored in the counterpart electronic device from the counterpart electronic device. Short-range wireless communication complies with various standards such as NFC, radio frequency identification (RFID), audio sink, electric field communication (EFC), human body communication (HBC), visible light communication (VLC), Bluetooth, and so forth, without being limited to a particular communication protocol. The counterpart electronic device recognized by short-range wireless communication is illustrated as another external electronic device 402 with respect to the electronic device 401, but this illustration is merely an example, and the counterpart electronic device can be an electronic device of a type different from the electronic device 401, such as a docking accessory, a camera accessory, or a detachable display, or may be another entity of the same type as the electronic device 401. Other embodiments are also possible.

The sensor module for proximity recognition (such as the sensor module 240) senses an external object (such as the electronic device 402) entering within a sensor-sensible range of the electronic device 401. The sensor module includes at least one of a gyro sensor (such as the gyro sensor 240B), an acceleration sensor (such as the acceleration sensor 240E), a magnetic sensor (such as the magnetic sensor 240D or a hole sensor), and a proximity sensor (such as the proximity sensor 240G). In certain embodiments, the sensor module recognizes proximity of an external object to the electronic device 401 by sensing with the gyro sensor or the acceleration sensor whether at least one of a position, an orientation, and an inclination angle of the electronic device 401 is maintained in a predetermined range for a predetermined time. For example, if at least one of a position, an orientation, and an inclination angle of the electronic device 401 with respect to the external object corresponds to the predetermined range, the electronic device 401 recognizes proximity of the external object thereto through the gyro sensor or the acceleration sensor if the external object has a structure capable of communicating with the electronic device 401 (such as a wireless docking station formed at a particular inclination angle). In certain embodiments, the sensor module senses a magnetic force generated by a magnet mounted on the external object for attachment/ detachment between the external object and the electronic device 401 by using a magnetic sensor to recognize proximity of the external object to the electronic device 401. In certain embodiments, the sensor module detects, by using a proximity sensor of a high-frequency oscillating type, a change in current induced by approaching of the external object to a high-frequency magnetic field generated by the electronic device 401, thus recognizing whether the external object is in proximity to the electronic device 401, a proximate distance of the external object to the electronic device 401, or a size of the external object. In certain embodiments, the sensor module recognizes proximity, the proximate distance, or the size of the external object, by detecting a change in a capacitance between the electronic device 401 and the external object with the use of a proximity sensor of a capacitive type.

The communication module 420 is wirelessly connected with another electronic device 402 proximate to the electronic device 401 for transmission and reception of data through wireless connection between the electronic device 401 and another electronic device 402. The communication module 402 is included, for example, in the communication module 220 illustrated in FIG. 2. In certain embodiments, the communication module 420 is implemented based on, for example, an ultra-short-range wireless communication scheme to improve the speed of data transmission and reception and power consumption. The ultra-short-range wireless communication scheme may transmit data at a relatively high speed or data rate (such as about 6 Gbps) while consuming a relatively small amount of power (such as about 50 mW) by transmitting and receiving data between contacting devices, or non-contacting devices spaced by an ultra-short distance (such as about 10 mm) using a high-frequency band (such as about 60 GHz).

In certain embodiments, the communication module 420 includes a plurality of sub modules 421 and 426, for example, a first communication module 421 and a second communication module 426, each of which operate in one of a plurality of communication modes including at least a transmission mode and a reception mode. For example, for bidirectional data communication between the electronic device 401 and another electronic device 402, the first communication module 421 and the second communication module 426 are in pair, such that when the first communication module 421 operates in the transmission mode, the second communication module 426 operates in the reception mode; whereas, when the first communication module 421 operates in the reception mode, the second communication module 426 may operate in the transmission mode.

In certain embodiments, the first communication module 421 and the second communication module 426 respectively include data processing circuits 423 and 428 that are set to one of the transmission mode and the reception mode or are switchable to the other communication mode. The first communication module 421 and the second communication module 426 further include RF circuits 422 and 427 for transmitting or receiving a radio frequency (RF) signal according to a communication mode of the respective data processing circuits 423 and 428, respectively. At least a part of the data processing circuits 423 and 428 is implemented in the form of a chip. At least a part of the RF circuits 422 and 427 is an antenna mounted in the chip or formed outside the chip. To support ultra-short-range wireless communication, the antenna is aligned in a vertical direction, in a diagonal direction, or in a side direction with respect to an antenna of another electronic device 402, and in this way, communication in the form of vertical launch, diagonal launch, or side launch with another electronic device 402 becomes possible.

In certain embodiments, the communication module 420 further includes a magnetic module 460. The magnetic module 460 generates a magnetic force for changing or fixing a position or an orientation of at least one of the electronic device 401 and another electronic device 402 for alignment between an RF circuit (such as an antenna) of the communication module 420 and an RF circuit (such as an antenna) of another electronic device 402. The magnetic module 460 forms arrangement where the electronic device 401 and another electronic device 402 are communicable with each other (such as, the electronic device 401 and another electronic device 402 are arranged such that the RF circuit of the electronic device 401 and the RF circuit of another electronic device 402 contact each other or are spaced apart from each other within a short-range wireless communication range) by changing a position or an orientation of at least one of the electronic device 401 and another electronic device 402, and positions and orientations of the electronic device 401 and another electronic device 402 are fixed in the formed arrangement. To this end, the magnetic module 460 is disposed in adjacent to at least one of the first communication module 421 and the second communication module 426.

In certain embodiments, the magnetic module 460 is configured to dynamically generate a magnetic force based on proximity recognition by the proximity recognition module 410, or is configured to generate a constant magnetic force regardless of proximity recognition. Although the magnetic module 460 is illustrated as a module included in the communication module 420 in FIG. 4, this illustration is merely an example and also is implemented with a separate module physically separated from the communication module 420. Other embodiments are also possible.

The power supply module 440 supplies at least one of power charged in an internal module (such as the battery 296) of the electronic device 401 and power supplied wirelessly from another electronic device 402 as power for the communication module 420, based on recognition of the proximity recognition module 410 with respect to another electronic device 402. The power supply module 440 is included in the power management module 295 illustrated in FIG. 2.

Generally, a communication standard or protocol for transmitting and receiving data at high speeds (such as about 60 MB/s or higher) is defined to wiredly receive power for driving a communication module from a counterpart electronic device (such as the electronic device 402) and to perform communication. For example, if a USB is wiredly coupled with (such as plugged in) a counterpart electronic device through an interface port, an electronic device (such as a USB communication standard device) corresponding to a particular port (such as a VBUS port) of the interface port receives a voltage of a predefined value (such as 5V) from the counterpart electronic device (such as a USB communication standard host) and initiates data transmission and reception through another port.

In certain embodiments, to provide an internal charged power of the electronic device 401 as power for the communication module 420 for high-speed data transmission and reception, the power supply module 440 provides the internal charged power to the communication module 420 as if the internal charged power is power (such as wiredly) supplied to the communication module 420 from the counterpart electronic device, another electronic device 402. To supply power wirelessly supplied from another electronic device 402 as the power for the communication module 420 for high-speed data transmission and reception, the power supply module 440 supplies the wirelessly supplied power to the communication module 420 as if the wirelessly provided power is power (such as wiredly) supplied to the communication module 420 from the counterpart electronic device, another electronic device 402. To this end, the power supply module 440 supplies, to a power supply line (such as VBUS) of the communication module 420, a voltage of a predefined value (such as 5V) corresponding to a protocol or a standard (such as USB or HDMI) to be used by the communication module 420 for communication of another electronic device 402, by using the internal charged power of the electronic device 401 or the wirelessly supplied power from another electronic device 402. In certain embodiments, to supply the wirelessly supplied power from another electronic device 402 as the power for the communication module 420, the power supply module 440 may further include a wireless charging module coupled with another electronic device 402 to wirelessly receive power from another electronic device 402.

The control module 450 (such as, the I/O control module 180) controls other elements of the electronic device 401, for example, the communication module 420. The control module 450 loads data to be transmitted through the communication module 420 from the memory 430 in association with data communication, delivers the loaded data to the communication module 420, and stores the data received through the communication module 420 in the memory 430. At least a part of the control module 450 is implemented with a processor illustrated in FIG. 2. In certain embodiments, the control module 450 supplies power supplied from the power supply module 440 as power for driving the communication module 420.

In certain embodiments, the control module 450 includes an interface selection module 452. The interface selection module 452 determines a protocol or a standard to be used by the communication module 420 for communication of another electronic device 402 based on a user input or preset information of the electronic device 401. In certain embodiments, the interface selection module 452 displays a list of selectable protocols (or standards) through a display (such as, the display 260) functionally connected to the electronic device 401 and recognizes a user input corresponding to one of the displayed protocols (or standards) through an input module (such as, the touch panel 252) of the electronic device 401 to determine the protocol (or standard) corresponding to the user input as the protocol (or standard) of the communication module 420. The interface selection module 452 delivers a control signal for setting or changing the protocol (or standard) to the communication module 420. If a set value for the voltage applied to a power supply line of the communication module 420 changes depending on a type of the protocol, the interface selection module 452 delivers, to the power supply module 440, a control signal for adjusting the voltage applied from the power supply module 440 with a set value corresponding to the protocol determined by the interface selection module 452.

In certain embodiments, the control module 450 further includes a mode selection module 455. The mode selection module 455 determines (or selects) a communication mode of at least one sub communication module including the first communication module 421 and the second communication module 426. The mode selection module 455 sets a communication mode for each of the first communication module 421 and the second communication module 426 or changes a previously set communication mode into another communication mode, based on determination (or selection) with respect to a communication mode for at least one sub communication mode. In certain embodiments, the mode selection module 455 determines a particular communication mode (such as, the transmission mode) as a communication mode of the first communication module 421, and delivers a control signal for changing a communication mode of the first communication module 421 into the particular communication mode to the first communication module 421 if the current communication mode of the first communication module 421 is not the determined particular communication mode (such as if the current communication mode is the reception mode). The mode selection module 455 determines a communication mode (such as the reception mode) other than the particular communication mode (such as the transmission mode) of the first communication module 421 as a communication mode of the second communication module 422, and delivers a control signal for setting or changing the communication mode of the second communication module 422 to the determined other communication mode to the second communication module 422.

In certain embodiments, the communication mode of the first commination module 421 may be a communication mode of the first data processing circuit 423. The communication mode of the second communication module 422 may be a communication mode of the second data processing circuit 428. In certain embodiments, for bidirectional communication, the communication mode of the first communication module 421 may be one (such as the transmission mode) of the transmission mode and the reception mode, and the communication mode of the second communication module 422 is the other (such as the reception mode) of the transmission mode and the reception mode.

In certain embodiments, the mode selection mode 455 determines a communication mode of at least one of the first communication module 421 and the second communication module 426, based on a communication mode of a counterpart communication module (not shown) of another electronic device 402, that corresponds to at least one of the first communication module 421 and the second communication module 426. The mode selection module 455 determines the reception mode as the communication mode of the first communication module 421, if a communication mode of a first counterpart communication module (not shown) corresponding to the first communication module 421 out of the counterpart communication modules of another electronic device 402 is the transmission mode. The mode selection module 455 determines the transmission mode as the communication mode of the second communication module 426, if the communication mode of a second counterpart communication module (not shown) corresponding to the second communication module 426 out of the counterpart communication modules of another electronic device 402 is the reception mode.

In certain embodiments, the electronic device 401 further include a mode recognition module 470 for recognizing a communication mode associated with another electronic device 402. The mode recognition module 470 recognizes a communication mode of at least one of the first counterpart communication module (not shown) corresponding to the first communication module 421 and the second counterpart communication module (not shown) corresponding to the second communication module 426, and provides the recognized communication mode of the counterpart communication module to the mode selection module 455.

In certain embodiments, to form bidirectional communication using first communication between the first communication module 421 and the first counterpart communication module and second communication between the second communication module 426 and the second counterpart communication module, the first communication and the second communication may be performed in a reverse direction. Thus, even when the mode recognition module 470 recognizes a communication mode of one of the first counterpart communication module and the second counterpart communication module, the mode selection module 455 determines the communication modes of the first communication module 421 and the second communication module 426 based on the recognized communication mode.

In certain embodiments, the mode recognition module 470 recognizes the communication mode of the first counterpart communication module and/or the second counterpart communication module based on a magnetic force generated by another electronic device 402, for example, a magnetic force generated in association with at least one of the first counterpart communication module and the second counterpart communication module. The mode recognition module 470 includes a magnetic sensor (such as, the magnetic sensor 240D) to sense the magnetic force generated by another electronic device 402.

In certain embodiments, the polarity of the magnetic force generated in the electronic device 401 or another electronic device 402 is formed to correspond to a communication mode of a communication module adjacent to a magnetic module for generating the magnetic force. For example, if the communication mode of the communication module adjacent to the magnetic module is the transmission mode, the polarity of the magnetic force generated in the magnetic module is to a first polarity (such as the N pole), and if the communication mode of the communication module adjacent to the magnetic module is the reception mode, the polarity of the magnetic force generated in the magnetic module is set to a second polarity (such as the S pole). However, this description is merely an example, and the communication mode and the polarity of the magnetic force is set reversely. Also, other embodiments are also possible.

Figure 5A:
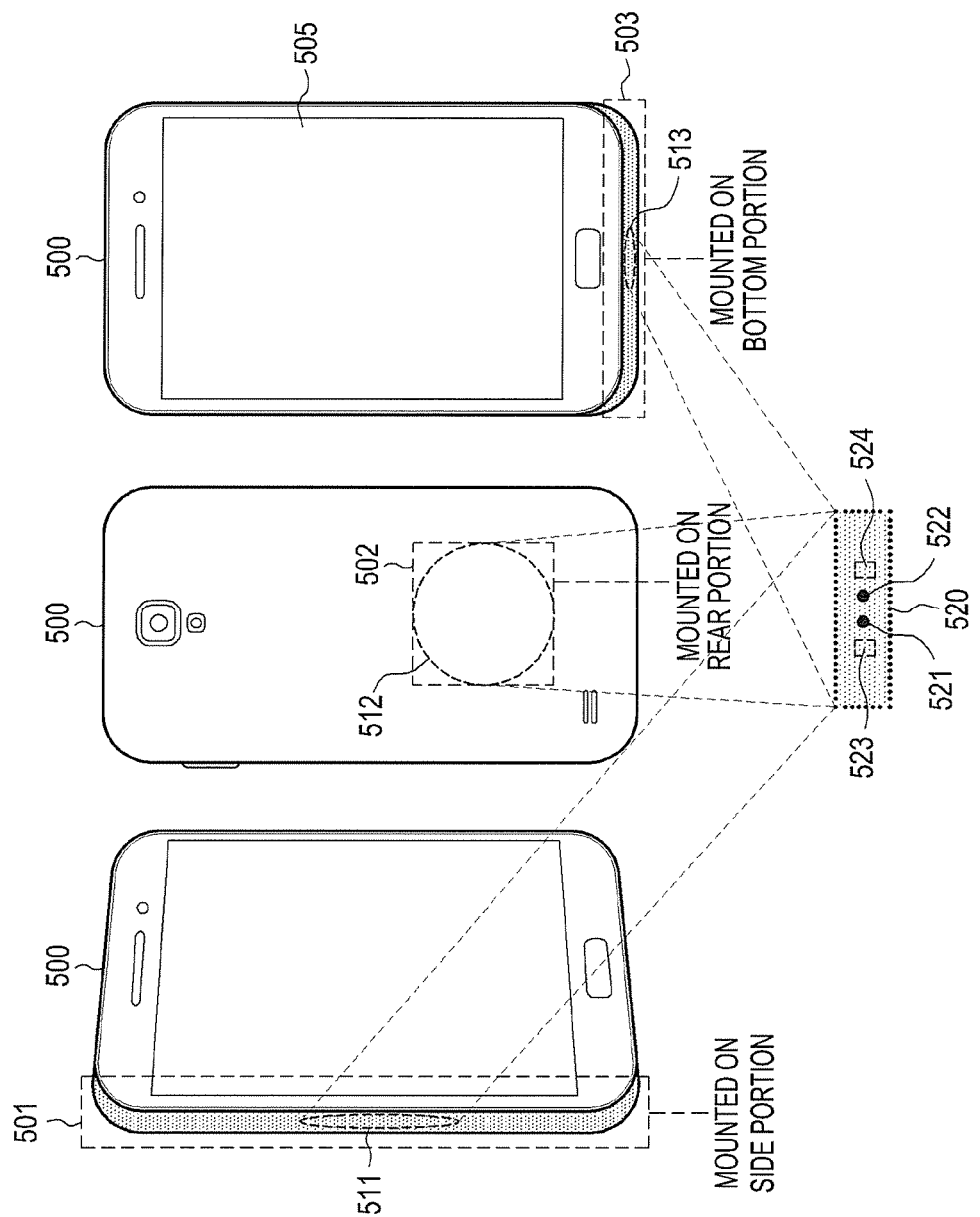
FIGS. 5A and 5B illustrate an example communication module of an electronic device according to various embodiments of the present disclosure.
Figure 5B:
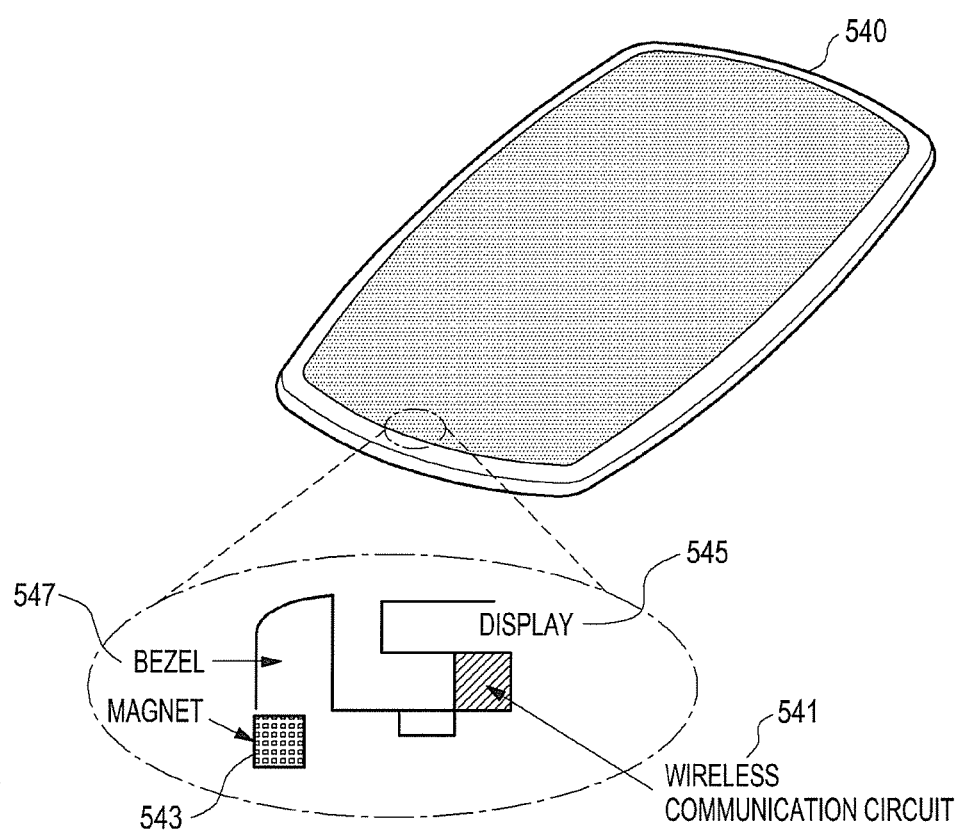

In certain embodiments, if a communication mode of at least one of the first communication module 421 and the second communication module 426 is set to correspond to the polarity of the magnetic force generated by the magnetic module 460, the mode selection module 455 determines not only a communication mode of at least one of the first communication module 421 and the second communication module 426, but also the polarity of the magnetic force generated by the magnetic module 460. The mode selection module 455 changes the polarity of the magnetic force generated by the magnetic module 460, based on the communication mode of at least one of the first counterpart communication module and the second counterpart communication module. FIGS. 5A and 5B illustrate an example in which a communication module is mounted in an electronic device according to various embodiments of the present disclosure. As illustrated in FIG. 5A, a communication module (such as, the communication module 420) according to various embodiments of the present disclosure is mounted on a side portion 501, a rear portion 502, or a bottom portion 503 of an electronic device 500 (such as the electronic device 401). In certain embodiments, if the communication module is mounted on the side portion 501 of the electronic device 500, the communication module is located in contact with or in non-contact with a side surface of the electronic device 500 for wireless data communication with another electronic device that contacts the side surface of the electronic device 500 or is adjacent in a non-contact manner to the side surface of the electronic device 500. In certain embodiments, if the communication module is mounted on the rear portion 502 of the electronic device 500, the communication module is located in contact with or in non-contact with a rear surface of the electronic device 500 for wireless data communication with another electronic device that contacts the rear surface of the electronic device 500 or is adjacent in a non-contact manner to the rear surface of the electronic device 500. In certain embodiments, if the communication module is mounted on the bottom portion 503 of the electronic device 500, the communication module is located in contact with or in non-contact with a bottom surface of the electronic device 500 for wireless data communication with another electronic device that contacts the bottom surface of the electronic device 500 or is adjacent in a non-contact manner to the bottom surface of the electronic device 500.

In certain embodiments, if the communication module (such as, the communication module 420) is mounted on at least one of the side portion 501, the rear portion 502, and the bottom portion 503 of the electronic device 500, a communication module area 520 corresponding to the communication module may be formed in one of a side bezel 511, a rear cover 512, and a bottom bezel 513. In certain embodiments, the communication module area 520 includes first communication area 521 and second communication area 522 through, which a wireless communication signal being input and output through an RF circuit of the communication module (such as, the first RF circuit 422 or the second RF circuit 427) passes at relatively high density. The communication module area 520 also includes first magnetism-generated area 523 and second magnetism-generated area 524 where a magnetic force for changing or fixing a position or an orientation of another electronic device is generated at relatively high density such that an RF circuit of a communication module of another electronic device contacts the first communication area 521 and second communication area 522 or is located in adjacent in a non-contact manner to the first communication area 521 and second communication area 522. In certain embodiments, a magnetic module for generating a magnetic force in a communication module is implemented with a plurality of magnets, at least one of which is located in adjacent to a corresponding RF circuit. Thus, the magnetism-generated area (such as, first magnetism-generated area 523 or second magnetism-generated area 524) corresponding to the magnetic module also formed in adjacent to the first communication area 521 or second communication area 522 corresponding to the RF circuit associated with the magnetic module.

In certain embodiments, the electronic device 500 displays information for guiding arrangement of the electronic device 500 and another electronic device for wireless data communication on a display 505 or an outer surface of the electronic device 500. In certain embodiments, the electronic device 500 displays, as at least a part of the information for guiding the arrangement, information indicating at least one of the communication module area 520, the first communication area 521 and second communication area 522, and the first magnetism-generated area 523 and second magnetism-generated area 524, in at least a part of a corresponding area or in adjacent to the corresponding area on the outer surface of the electronic device 500.

As illustrated in FIG. 5B, an electronic device 540 (such as, the electronic device 401) having mounted thereon a communication module (such as, the communication module 420) according to various embodiments of the present disclosure is designed to have a substantially holeless outer surface. For example, the outer surface of the electronic device 540 is formed such that a hole is substantially invisible. For a device where a part of an I/O interface (such as a USB connector) is formed to be connected with an external device through an interface hole exposed on an outer surface of the device, the device is designed to have a complex exterior structure due to the interface hole through which a circuit associated with the I/O interface is exposed to an external environment. As a result, the device has a structure having a limitation in safety against the external environment, for example, a vulnerable structure with respect to water, dust, or other foreign substances. Moreover, users are likely to experience the inconvenience of having to connect an external device to the device in a way to fit for such a structure of the device. Therefore, by being implemented with the substantially holeless outer surface, the electronic device 540 has an exterior structure that is robust against a change in the external environment without losing simplicity.

In certain embodiments, at least a circuit 541 of a communication module, for example, an RF circuit (such as, the first RF circuit 422 or the second RF circuit 427) and/or a data processing circuit (such as, the first data processing circuit 421 or the second data processing circuit 426), is disposed under a display panel 545 positioned on a front surface of the electronic device 540 and is connected with another element (such as a processor) of the electronic device 540. In certain embodiments, a part of a communication module or at least a part of a magnetic module 543 formed separately from the communication module is included in a bezel 547 surrounding at least a part of an edge of the electronic device 540.

Figure 6:
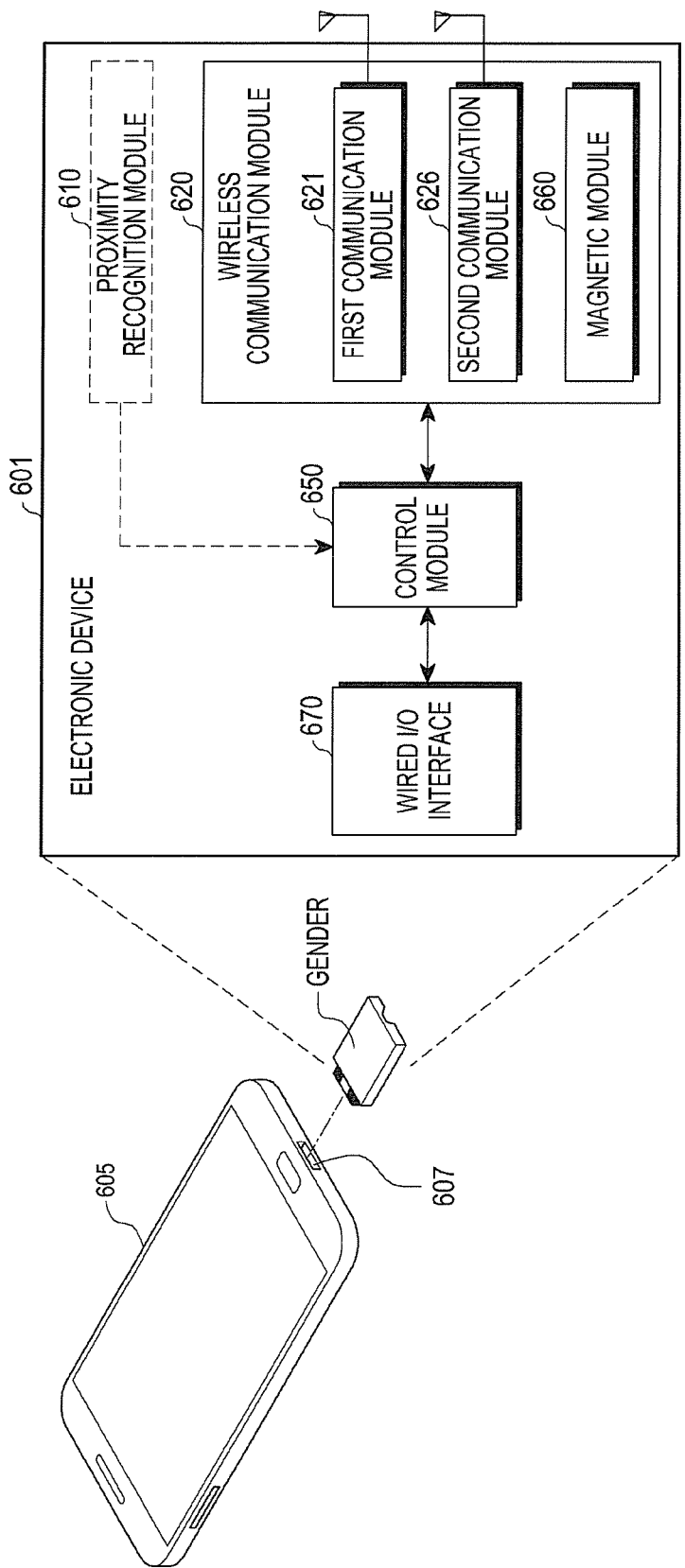
FIG. 6 illustrates an example electronic device structure with an external electronic device according to various embodiments of the present disclosure.

FIG. 6 schematically illustrates an electronic device structured to be physically coupled to an external electronic device according to various embodiments of the present disclosure. As illustrated in FIG. 6, an external electronic device 605 according to an embodiment of the present disclosure may be formed such that a part of an I/O interface (such as a USB connector) is connected with another device through an interface hole 607 exposed on an outer surface of the external electronic device 605. If another device to be connected with the external electronic device 605 is, for example, the electronic device 402 illustrated in FIG. 4, the external electronic device 605 may further include an element capable of communicating with the electronic device 402 having no structure for wired connection through an interface hole. The external electronic device 605 couples such an element to the interface hole 607 exposed on the outer surface of the external electronic device 605 for wired I/O connection.

The electronic device 601 according to an embodiment of the present disclosure has a structure for physical coupling in a removable manner to the interface hole 607 for wired I/O connection of the external electronic device 605, for example, a gender structure. A connector for connection between the electronic device 601 and the external electronic device 605 protrudes from the interface hole 607 of the external electronic device 605. The connector formed in the interface hole 607, for example, is physically connected with an element of the electronic device 601, for example, a wired I/O interface 670.

The electronic device 601 includes a proximity recognition module 610, a wireless communication module 620, a control module 650, and the wired I/O interface 670. The wireless communication module 620 may include a first communication module 621, a second communication module 626, and a magnetic module 660. The proximity recognition module 610, the first communication module 621, the second communication module 626, and the magnetic module 660 of the electronic device 601 are elements corresponding to the proximity recognition module 410, the first communication module 421, the second communication module 426, and the magnetic module 460 illustrated in FIG. 4, and is configured to perform functions that are similar to or the same as those of the corresponding elements of the electronic device 401. Although the proximity recognition module 610 is illustrated as being included inside the electronic device 601 in FIG. 6, this illustration is merely an example, such that the proximity recognition module 610 is disposed outside the external electronic device 605 that is physically coupled with the electronic device 601 through the interface hole 607 to enable the electronic device 601 to receive a signal associated with proximity recognition through the wired I/O interface 670. Other embodiments are also possible.

When the electronic device 601 and the external electronic device 605 are physically coupled to each other, the control module 650 sends data or a command, received through the wired I/O interface 670 from the external electronic device 605, to another electronic device through the wireless communication module 620 in association with data communication, and may deliver the data or the command, received from another electronic device through the wireless communication module 620, to the external electronic device 605 through the wired I/O interface 670. The control module 650 is configured to operate under control of the external electronic device 605 in association with data communication.

Figure 7:
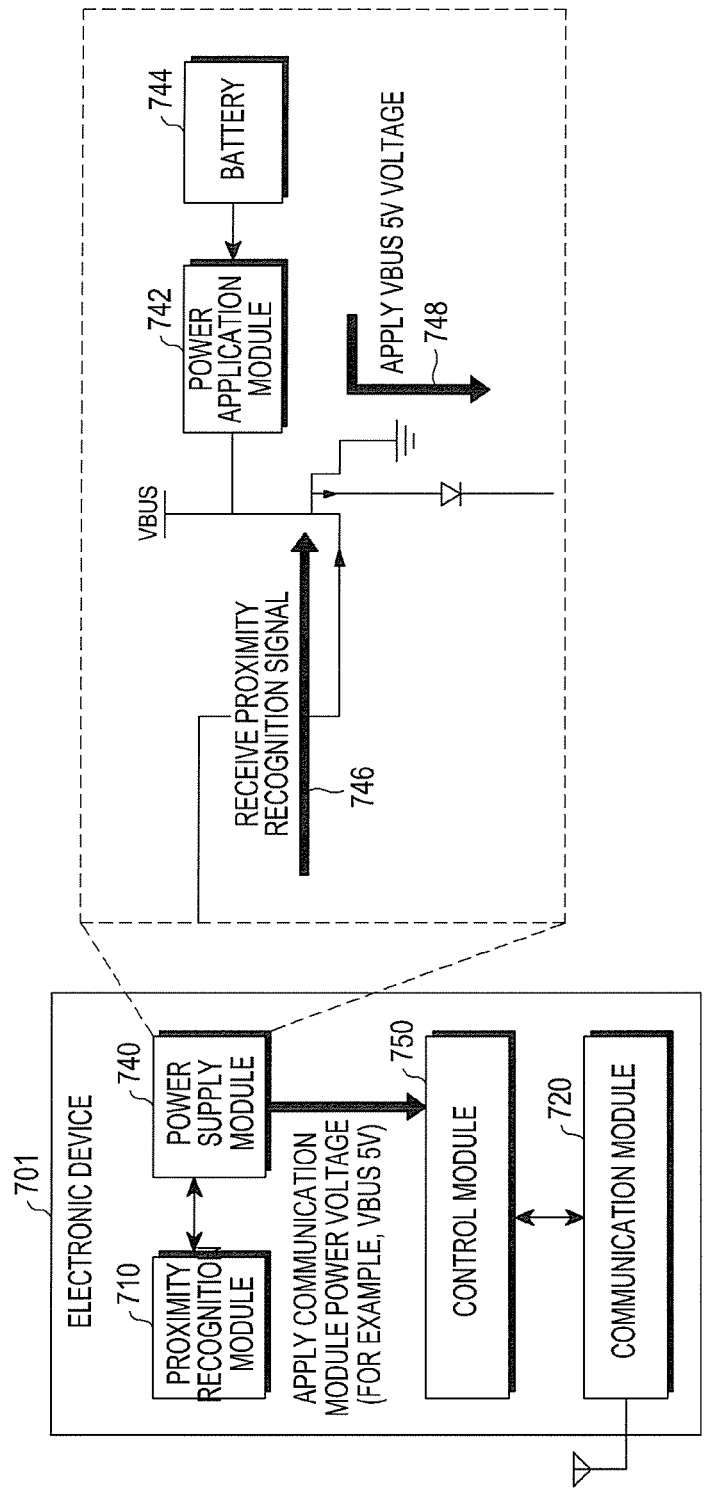
FIG. 7 illustrates an example structure of an electronic device with internal charged power according to various embodiments of the present disclosure.

FIG. 7 illustrates a structure for driving a communication module of an electronic device with internal charged power according to various embodiments of the present disclosure.

As illustrated in FIG. 7, an electronic device 701 (such as, the electronic device 401) includes a proximity recognition module 710, a communication module 720, a power supply module 740, and a control module 750. The proximity recognition module 710, the communication module 720, the power supply module 740, and the control module 750 of the electronic device 701 are elements corresponding to the proximity recognition module 410, the communication module 420, the power supply module 440, and the control module 450 of the electronic device 401 illustrated in FIG. 4, and is configured to perform functions that are similar to or the same as those of the corresponding elements of the electronic device 401.

In certain embodiments, the power supply module 740 includes a power application module 742 and a battery 744. In certain embodiments, the power application module 742 receives a proximity recognition signal as indicated by 746 through a signal line between the proximity recognition module 710 and the power application module 742. The power application module 742 boosts an input voltage for a power supply line VBUS of the communication module 720 by using power charged in the battery 744, and applies a voltage of a predefined value (such as 5V) as indicated by 748 in association with the power supply line VBUS. The power apply module 742 may include a circuit such as a direct current-direct current (DC-DC) converter or low dropout (LDO) to apply a voltage of a predefined value.

In certain embodiments, the control module 750 provides power (such as, the power charged in the battery 744) provided through the power supply module 740 to the communication module 720 by using circuit switching associated with the power supply line VBUS of the communication module 720, as if the provided power is supplied from an external device (such as a host) to the communication module 720.

Figure 8:
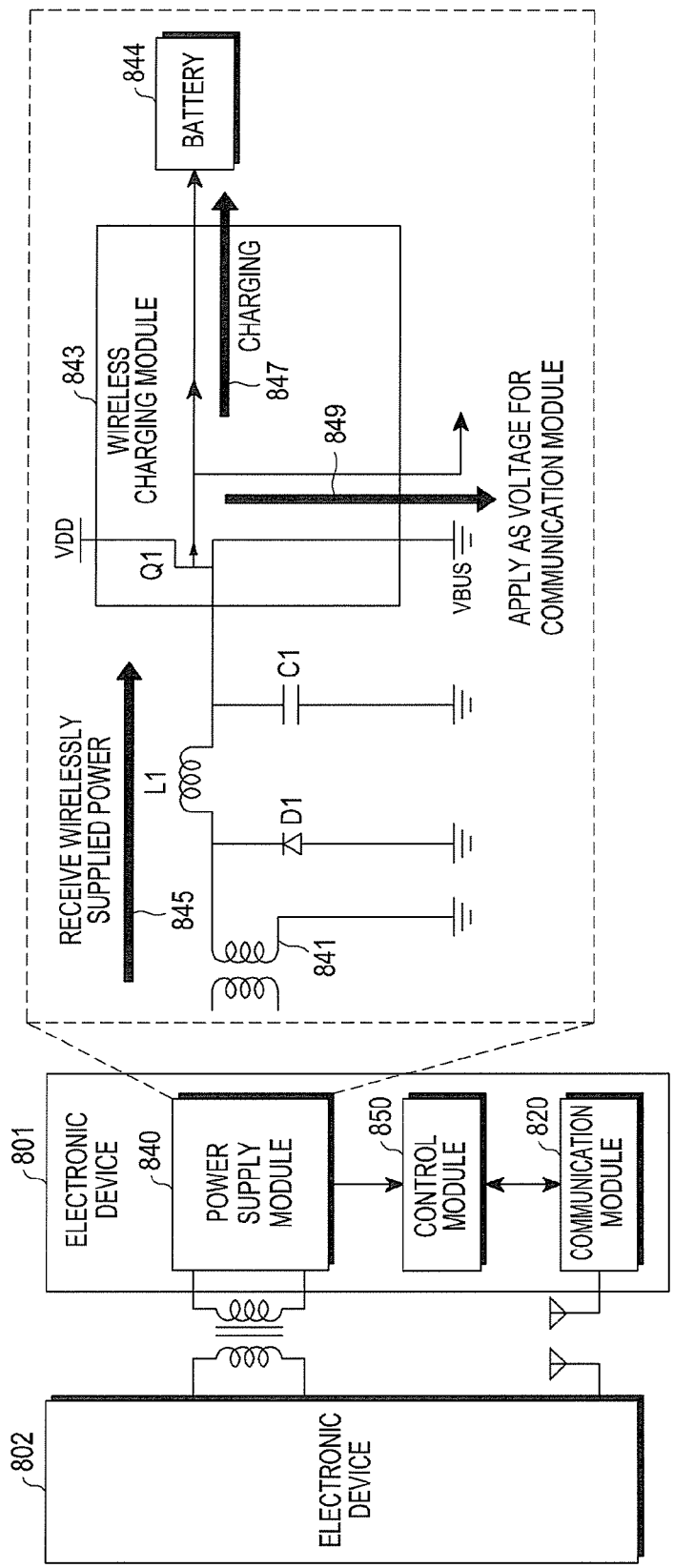
FIG. 8 illustrates an example structure of an electronic device with wirelessly supplied power according to various embodiments of the present disclosure.

FIG. 8 illustrates a structure for driving a communication module of an electronic device with wirelessly supplied power according to various embodiments of the present disclosure.

As illustrated in FIG. 8, an electronic device 801 (such as, the electronic device 401) includes a communication module 820, a power supply module 840, and a control module 850. The communication module 820, the power supply module 840, and the control module 850 of the electronic device 801 are elements corresponding to the communication module 420, the power supply module 440, and the control module 450 of the electronic device 401 illustrated in FIG. 4, and may be configured to perform functions that are similar to or the same as those of the corresponding elements of the electronic device 401.

In certain embodiments, the power supply module 840 includes a coil unit 841, a wireless charging module 843, and a battery 844. The coil unit 841 receives power from a coil formed in an external electronic device 802 proximate to the electronic device 801 by using wireless charging such as magnetic induction or resonance. The wireless charging is automatically performed in reaction to proximity between the electronic device 801 and the external electronic device 802, independently of proximity recognition in the electronic device 801.

The wireless charging module 843 receives wirelessly supplied power as indicated by 845 through the coil unit 841. The wirelessly supplied power received through the coil unit 841 is applied as substantially the same voltage as a predefined value (such as 5V) in association with the power supply line VBUS of the communication module 820. The wireless charging module 843 charges the battery 844 by using the received wirelessly supplied power, as indicated by 847, or applies the received wirelessly supplied power as a voltage for the power supply line VBUS of the communication module 820 through the control module 850, as indicated by 849. Voltage application with respect to the battery charging and the communication module 820 is performed simultaneously or selectively. Other embodiments are also possible.

The control module 850 provides the wirelessly supplied power provided through the power supply module 840 to the communication module 820 by using circuit switching associated with the power supply line VBUS of the communication module 820, as if the wirelessly supplied power is supplied wiredly from an external device (such as a host) of the electronic device to the power supply line VBUS of the communication module 820.

In certain embodiments, an electronic device includes a proximity recognition module (such as, the proximity recognition module 410) configured to recognize another device proximate to the electronic device, a communication module (such as, the communication module 420) configured to wirelessly transmit and receive data to and from another device, and a power supply module (such as, the power supply module 440) configured to apply at least one of power charged inside the electronic device and power wirelessly supplied from another device as power for the communication module, based on the recognition with respect to another device.

In certain embodiments, an outer surface of the electronic device is formed such that a hole is substantially invisible.

In certain embodiments, the proximity recognition module is configured to obtain proximity of another device or identification information regarding another device, as at least a part of the recognition.

In certain embodiments, the proximity recognition module includes at least one of an NFC module, an RFID module, an audio sync module, an EFC module, a HBC module, a VLC module, a Bluetooth module, a proximity sensor, and a gyro sensor.

In certain embodiments, the power supply module is configured to supply the charged power or the wirelessly supplied power to the communication module through a power supply line of the communication module set to receive power wirelessly from another device.

In certain embodiments, the power supply module includes a wireless charging module coupled with another device to receive power wirelessly from another device.

In certain embodiments, the electronic device further includes an interface selection module configured to determine a protocol of the communication module based on at least one of a user input and information being preset in the electronic device.

In certain embodiments, the interface selection module is set to adjust setting of a voltage to be applied to a power supply line of the communication module based on the determination.

In certain embodiments, the communication module may be mounted inside the electronic device and is adjacent in a contact manner or in a non-contact manner to at least one surface of the electronic device.

In certain embodiments, the communication module is mounted in a connection structure that is attachable to or detachable from at least one terminal exposed on the outer surface of the electronic device.

In certain embodiments, the communication module includes at least a first communication module and a second communication module, each of which is configured to operate in one of a plurality of communication modes including at least a transmission mode and a reception mode.

In certain embodiments, the electronic device further includes a mode selection module (such as, the mode selection module 455) configured to determine a communication mode of at least one of the first communication module and the second communication module, based on a communication mode of a counterpart communication module of another device, which corresponds to at least one of the first communication module and the second communication module.

In certain embodiments, an electronic device includes a proximity recognition module (such as, the proximity recognition module 410) configured to recognize another device proximate to the electronic device and a first communication module and a second communication module (such as, the first communication module 421 and the second communication module 422) functionally connected with the proximity recognition module to communicate with another device in a plurality of communication modes including a transmission mode and a reception mode, in which the first communication module is configured to be wirelessly connected to another device in a communication mode selected from among the plurality of communication modes, and the second communication module is configured to be wirelessly connected to another device in another communication mode selected from among the plurality of communication modes.

In certain embodiments, an outer surface of the electronic device may be formed such that a hole is substantially invisible.

In certain embodiments, the proximity recognition module includes at least one of an NFC module, an RFID module, an audio sync module, an EFC module, a HBC module, a VLC module, a Bluetooth module, a proximity sensor, and a gyro sensor.

In certain embodiments, the electronic device further includes a mode selection module (such as, the mode selection module 455) configured to select the at least one communication mode based on a communication mode of at least one counterpart communication module of a first counterpart communication module corresponding to the first communication module and a second counterpart communication module corresponding to the second communication module.

In certain embodiments, the mode selection module is configured to change a polarity of a magnetic force generated in association with another device, based on a communication mode of at least one counterpart communication module of the first counterpart communication module and the second counterpart communication module.

In certain embodiments, the electronic device further includes a magnetic module (such as, the magnetic module 460) that is adjacent to at least one of the first communication module and the second communication module to generate a magnetic force in association with another device and to change or fix a position or an orientation of at least one of the electronic device and another device such that the at least one communication module is wirelessly connected to another device.

In certain embodiments, the magnetic module includes a magnet having one of a first polarity and a second polarity outwardly from the electronic device.

In certain embodiments, the electronic device further includes a mode recognition module (such as, the mode recognition module 470) configured to recognize a communication mode of at least one of a first counterpart communication module corresponding to the first communication module and a second counterpart communication module corresponding to the second communication module.

In certain embodiments, the mode recognition module is configured to recognize a communication mode of the at least one counterpart communication module based on a polarity of a magnetic force sensed from at least one of the first counterpart communication module and the second counterpart communication module.

In certain embodiments, the proximity recognition module is disposed in at least one of the electronic device and an external device that is physically couplable with the electronic device.

Figure 9:
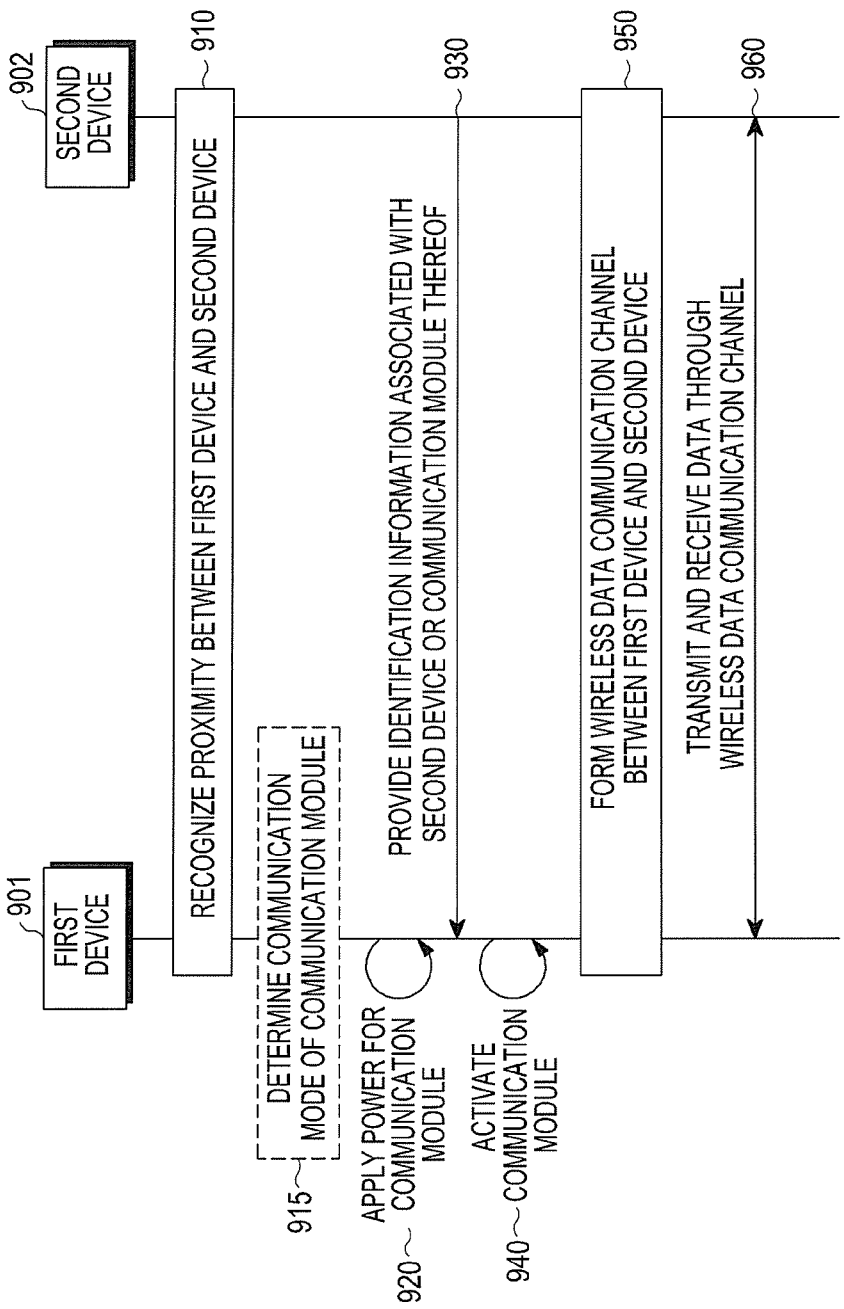
FIG. 9 illustrates an example process of a wireless data communication between electronic devices according to various embodiments of the present disclosure.

FIG. 9 illustrates a process of wireless data communication between electronic devices in certain embodiments.

As illustrated in FIG. 9, a first device 901 is the electronic device 401 illustrated in FIG. 4, and a second device 902 may be another electronic device 402 illustrated in FIG. 4.

In operation 910, the first electronic device 901 and the second electronic device 902 recognize proximity therebetween. In operation 915, the first device 901 determines a communication mode of a communication module of the first device 901. As illustrated in FIG. 9, the first device 901 determines a communication mode in operation 915 after recognizing the proximity in operation 910, but this is merely an example, and the communication mode of the communication module of the first device 901 may have been set regardless of the proximity recognition performed in operation 910, and the first device 901 maintains or changes the communication mode after performing the proximity recognition in operation 910. The communication mode of the communication module of the first device 901 and the communication mode of the communication module of the second device 902 is implemented, such that the first device 901 changes or fixes a position or an orientation of the second device 902 to correspond to the second device 902 by using a magnetic force. In this embodiment, operation 915 of determining (or changing) the communication mode in the first device 901 may be skipped. Other embodiments are also possible.

In operation 920, the first device 901 applies internal charged power of the first device 901 or wirelessly supplied power from the second device 902 as power for the communication module. The first device 901 is implemented to apply the power for the communication module in reaction to the proximity recognition of operation 910, but this is merely an example. In certain embodiments, the first device 901 is implemented to apply the power for the communication module in operation 920, regardless of the proximity recognition of operation 910. Other embodiments are also possible.

In operation 930, the second device 902 provides identification information (such as an ID) associated with the second device 902 or the communication module thereof to the first device 901. As illustrated in FIG. 9, the first device 901 may be provided with the identification information associated with the second device 902 or the communication module thereof after applying the power in operation 920, but this is merely an example. In certain embodiments, if the proximity recognition is performed using NFC in operation 910, the first device 901 is implemented to receive the identification information associated with the second device 902 or the communication module thereof as a part of the proximity recognition of operation 910 or simultaneously with the proximity recognition of operation 910. The identification information is provided independently of the proximity recognition. For example, the second device 902 generates a magnetic force having a specific pattern in association with the communication module, and the first device 901 recognizes the pattern of the magnetic force formed by the second device 902 and recognizes the identification information associated with the second device 902 or the communication module thereof based on the recognized pattern. Other embodiments are also possible.

In operation 940, the first device 901 activates the communication module thereof based on a communication mode set for the communication module. In certain embodiments, the first device 901 activates the communication module thereof in the communication mode determined (or changed) in operation 915 or in a communication mode that is preset in association with the communication module thereof regardless of operations 910 through 930.

In operation 950, the first device 901 forms a wireless data communication channel between the communication module of the first device 901 and the communication module of the second device 902 based on the identification information obtained in operation 930. The wireless data communication channel is formed based on a communication standard such as USB, HDMI, a mobile industry processor interface (MIPI), a mobile display port (MyDP), serial advanced technology attachment (SATA), general purpose input output (GPIO), an inter-integrated circuit (I2C), peripheral component interconnect express (PCIe), auxiliary (Aux), or the like.

In operation 960, the first device 901 and the second device 902 transmit and receive data through the wireless data communication channel formed in operation 950. The data transmitted and received through the wireless data communication channel includes various types of data such as user data, audio, video, multimedia contents, or applications.

FIGS. 10A, 10B and 10C illustrate an example flowchart for determining a communication mode for an electronic device according to various embodiments of the present disclosure.

As illustrated in FIGS. 10A-10C, an electronic device (such as, the electronic device 401) performs wireless data communication with a counterpart communication module 1020 of a counterpart electronic device (such as, the electronic device 402) by using a communication module 1010. In certain embodiments, the communication module 101 includes a first communication module 1011 and a second communication module 1012. The first communication module 1011 is set to one of a transmission mode TX and a reception mode RX, and the second module 1012 is set to the other communication mode for bidirectional communication.

In certain embodiments, the counterpart communication module 1020 includes a first counterpart communication module 1021 and a second counterpart communication module 1022 in association with wireless data communication with the communication module 1010. The first counterpart communication module 1021 performs data communication with the first communication module 1011 as the counterpart of the first communication module 1011 in association with wireless data communication. The first counterpart communication module 1021 is set to a communication mode that is opposite to the communication mode of the first communication module 1011. For example, if the communication mode of the first communication module 1011 is the reception mode, the communication mode of the second communication module 1012 may be the transmission mode. Like the first counterpart communication module 1021, the second counterpart communication module 1022 performs data communication with the second communication module 1012 as the counterpart of the second communication module 1012 in association with wireless data communication, and may be set to a communication mode (such as, the reception mode) that is opposite to the communication mode (such as, the transmission mode) of the second communication module 1012.

To perform wireless data communication in the foregoing manner, in operation 1041, (the proximity recognition module (such as, the proximity recognition module 410 of) the electronic device recognizes the communication mode of at least one of the first counterpart communication module 1021 and the second counterpart communication module 1022 of the counterpart electronic device. The electronic device recognizes a counterpart communication module of the counterpart electronic device, which is closer to the first communication module 1011, as the first counterpart communication module 1021, because the first communication module 1011 needs to receive a radio signal transmitted by the first counterpart communication module 1021 at relatively high efficiency. Likewise, the electronic device recognizes the counterpart communication module of the counterpart electronic device, which is closer to the second communication module 1012, as the second counterpart communication module 1022, because the second communication module 1012 has to receive the radio signal transmitted by the second counterpart communication module 1022 at relatively high efficiency.

In certain embodiments, the electronic device recognizes both the communication mode of the first counterpart communication module 1021 and the communication mode of the second counterpart communication module 1022 or recognizes the communication mode of one of the two counterpart communication modules and then set the communication mode of the other counterpart communication module to the opposite communication mode. For example, if the communication mode of the first counterpart communication module 1021 is recognized as the transmission mode, the electronic device recognizes the communication mode of the second counterpart communication module 1022 as the reception mode, even if further recognition associated with the communication mode of the second counterpart communication module 1022 is not performed.

In operation 1042, (the mode selection module (such as, the mode selection module 455 of) the electronic device determines whether the electronic device and the counterpart electronic device are arranged in opposite reverse direction to the arrangement guide for wireless data communication, based on the communication modes of the first communication module 1011 and the second communication module 1012 and the communication mode of the counterpart communication module 1021 and/or 1022 recognized in operation 1041. The electronic device determines that the electronic device and the counterpart electronic device are arranged in the reverse direction to the arrangement guide, if the communication mode of the first communication module 1011 and the communication mode of the first counterpart communication module 1021 close to the first communication module 1011 are the same as each other, or if the communication mode of the second communication module 1012 is the same as the communication mode of the second counterpart communication module 1022 close to the second communication module 1012.

In certain embodiments, if the communication modes of the first communication module 1011 and the second communication module 1012 of the electronic device are set to the reception mode RX and the transmission mode TX, respectively, and if the communication modes of the first counterpart communication module 1021 and the second counterpart communication module 1022 are recognized as the transmission mode TX and the reception mode RX, respectively, the electronic device determines that the electronic device and the counterpart electronic device are arranged in a normal direction with respect to the arrangement guide as indicated by 1031. If the communication modes of the first counterpart communication module 1021 and the second counterpart communication module 1022 are recognized as the reception mode RX and the transmission mode TX, the electronic device determines that the electronic device and the counterpart electronic device are arranged in the reverse direction with respect to the arrangement guide.

In operation 1043, if it is determined that the electronic device and the counterpart electronic device are arranged in the normal direction as indicated by 1031, operation 1045 is performed where the electronic device prepares for data communication between the electronic device and the counterpart electronic device based on the communication mode of the first communication module 1011 and the communication mode of the second communication module 1012.

In operation 1043, if it is determined that the electronic device and the counterpart electronic device are arranged in the reverse direction as indicated by 1032, operation 1044 is performed where (the mode selection module (such as, the mode selection module 455) of) the electronic device switches the communication mode of the first communication module 1011 and the communication mode of the second communication module 1012. For example, the communication mode of the first communication module 1011 and the communication mode of the second communication module 1012 of the electronic device, when being set to the transmission mode TX and the reception mode RX, respectively, may switch to the reception mode RX and the transmission mode TX, respectively, as indicated by 1033, if it is determined that the electronic device and the counterpart electronic device are arranged in the reverse direction as indicated by 1032. In this way, if communication mode switching occurs, the electronic device prepares for data communication between the electronic device and the counterpart electronic device based on the switched communication mode in operation 1045.

Figure 11:
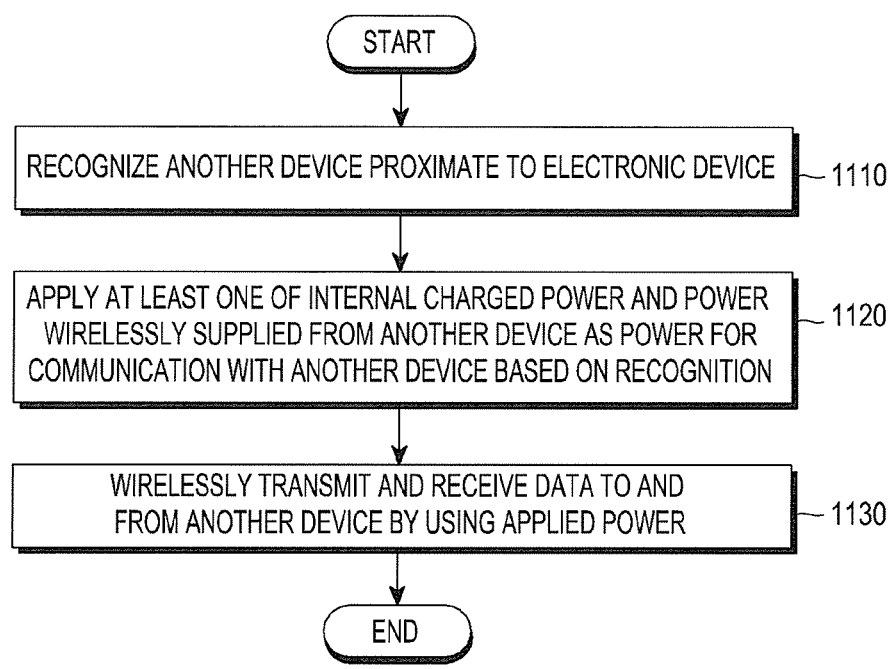
FIG. 11 illustrates an example flowchart for an input/output controlling of an electronic device according to various embodiments of the present disclosure.

FIG. 11 illustrates an example flowchart of an input and output control method for an electronic device according to various embodiments of the present disclosure. As illustrated in FIG. 11, in operation 1110, the proximity recognition module (such as, the proximity recognition module 410) of the electronic device recognizes another device (such as, another electronic device 402) proximate to the electronic device. The proximity recognition module of the electronic device obtains proximity of another device or identification information associated with another device, by using a short-range communication module or a sensor module.

In operation 1120, the power supply module (such as, the power supply module 440) of the electronic device applies at least one of power charged inside the electronic device (such as, a battery) and power supplied wirelessly from another device as power for communication with another device, based on the recognition of another electronic device. The power supply module of the electronic device applies the internal charged power as the power supplied to a power supply line (such as, VBUS) associated with the communication in reaction to a proximity recognition signal generated in operation 1110. The power supply module of the electronic device may also apply the wirelessly supplied power obtained by the proximity as the power supplied to the power supply line (such as, VBUS) associated with the communication in reaction to proximity between the electronic device and another device, independently of operation 1110. In operation 1130, the communication module (such as, the communication module 420) of the electronic device wirelessly transmits and receives data with another device based on the applied power.

Figure 12:
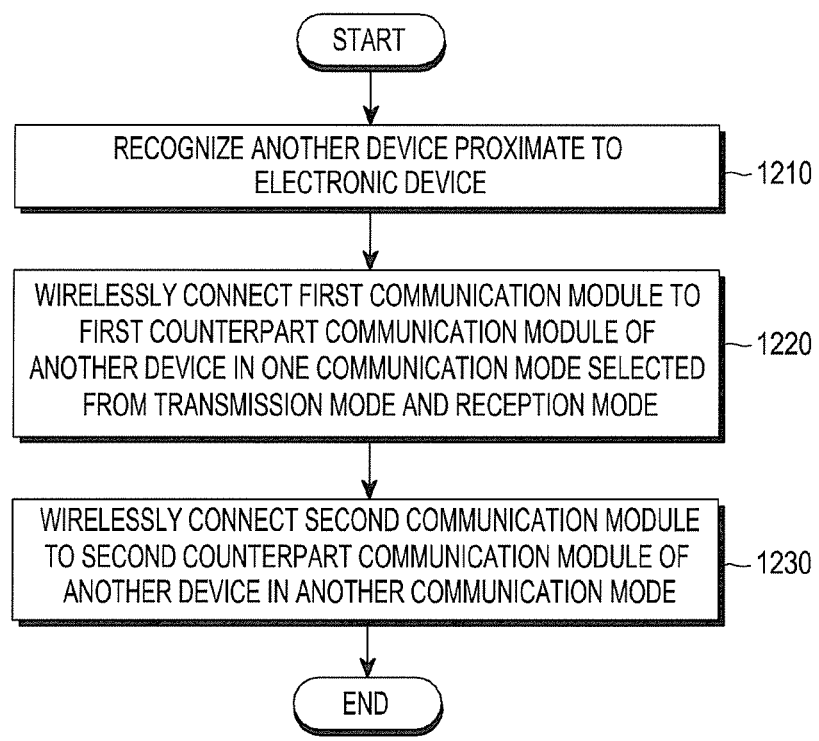
FIG. 12 illustrates an example flowchart for setting a communication mode of electronic device according to various embodiments of the present disclosure.

FIG. 12 illustrates an example flowchart for setting a communication mode of an electronic device according to various embodiments of the present disclosure. As illustrated in FIG. 12, in operation 1210, the proximity recognition module (such as, the proximity recognition module 410) of the electronic device recognizes another device (such as, another electronic device 402) proximate to the electronic device.

In operation 1220, the mode selection module (such as, the mode selection module 455) of the electronic device wirelessly connects a first communication module (such as, the first communication module 421) functionally connected to the electronic device to another device in one of a plurality of communication modes including the transmission mode and the reception mode. In operation 1230, the mode selection module (such as, the mode selection module 455) of the electronic device wirelessly connects a second communication module (such as, the second communication module 426) functionally connected to the electronic device to another device in another one of the plurality of communication modes.

Operations included in the process or method illustrated in FIGS. 9 through 12 (such as operations 910 through 960, 1041 through 1045, 1110 through 1130, and 1210 through 1230) are executed in a sequential, parallel, repetitive or heuristic manner. Also, some of the operations are executed in different order or omitted, or have additional different operations.

In certain embodiments, a data input/output method for an electronic device includes recognizing another device proximate to an electronic device, applying at least one of power charged in the electronic device and power wirelessly supplied from another device as power for communication with another device, based on the recognition of another device, and wirelessly transmitting and receiving data to and from another device based on the applied power.

In certain embodiments, an outer surface of the electronic device is formed such that a hole is substantially invisible.

In certain embodiments, the recognizing includes obtaining proximity or identification information of another device as at least a part of the recognizing.

In certain embodiments, the recognizing uses at least one of an NFC module, an RFID module, an audio sync module, an EFC module, a HBC module, a VLC module, a Bluetooth module, a proximity sensor, and a gyro sensor.

In certain embodiments, the recognizing includes being coupled with another device to wirelessly receive power from another device.

In certain embodiments, a data input/output method for an electronic device includes recognizing another device proximate to an electronic device, wirelessly connecting a first communication module functionally connected to the electronic device to another device in one selected from a plurality of communication modes including a transmission mode and a reception mode, and wirelessly connecting a second communication module functionally connected to the electronic device to another device in another one selected from the plurality of communication modes.

In certain embodiments, an outer surface of the electronic device is formed such that a hole is substantially invisible.

In certain embodiments, the recognizing uses at least one of an NFC module, an RFID module, an audio sync module, an EFC module, a HBC module, a VLC module, a Bluetooth module, a proximity sensor, and a gyro sensor.

In certain embodiments, the data input and output method further includes selecting the at least one communication mode based on a communication mode of at least one counterpart communication module of a first counterpart communication module corresponding to the first communication module and a second counterpart communication module corresponding to the second communication module.

In certain embodiments, the data input and output method further includes generating a magnetic force in association with another device and to change or fix a position or an orientation of at least one of the electronic device and another device such that the at least one communication module is wirelessly connected to another device.

In certain embodiments, the data input and output method further includes changing a polarity of a magnetic force generated in association with another device, based on a communication mode of at least one counterpart communication module of the first counterpart communication module and the second counterpart communication module.

In certain embodiments, the data input and output method further includes recognizing a communication mode of at least one of a first counterpart communication module corresponding to the first communication module and a second counterpart communication module corresponding to the second communication module.

In certain embodiments, the recognizing of the communication mode of the at least one counterpart communication modules is based on a polarity of a magnetic force sensed from at least one of the first counterpart communication module and the second counterpart communication module.

The electronic device or the method according to various embodiments of the present disclosure includes one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations. The embodiments disclosed herein have been provided for description and understanding of disclosed technical matters, and are not intended to limit the scope of the present disclosure. Therefore, it is construed that the scope of the present disclosure includes any change or other various embodiments based on the technical spirit of the present disclosure.

As is apparent from the foregoing description, the electronic device according to various embodiments of the present disclosure has an exterior structure that is robust against an external environment change and is simple, by using an I/O interface based on wireless communication. The electronic device transmits and receives data at a relatively high transmission speed as the electronic device applies power for the wireless communication-based I/O interface based on proximity recognition with respect to another device, and efficiently operates power consumption for data transmission and reception. For example, the communication mode of the first communication module and the communication mode of the second communication module is set differently to bidirectionally input and output data at the same time, and also is adjusted dynamically to prevent reverse coupling between the electronic device and another device. The electronic device generates a magnetic force in association with another device proximate to the electronic device to adjust a position or an orientation of the electronic device or another device for an arrangement where the electronic device and another device are automatically connected to each other in a wireless manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A first electronic device comprising:
a proximity recognition module configured to perform a recognition of a second electronic device proximate to the first electronic device;
a communication module including a first communication module and a second communication module configured to wirelessly transmit and receive data to and from the second electronic device, the communication module including a magnetic module capable of being set to a first polarity and a second polarity;
a power supply module; and
a processor configured to:
control the power supply module to apply at least one of a power charged in the first electronic device or a power wirelessly supplied from the second electronic device as power for the communication module associated with the second electronic device, wherein the magnetic module of the communication module is set to correspond to a polarity of a magnetic force between the first electronic device and the second electronic device,
determine communication modes of counterpart communication modules included in the second electronic device, and
control the first communication module and the second communication module to be operated in a different communication mode from a respective counterpart communication module of the second electronic device.

2. The first electronic device of claim 1, wherein an outer surface of the first electronic device is formed with a hole that is substantially invisible.

3. The first electronic device of claim 1, wherein the proximity recognition module is configured to obtain at least one of a proximity of the second electronic device or an identification information associated with the second electronic device as at least a part of the recognition.

4. The first electronic device of claim 1, wherein the proximity recognition module comprises at least one of a near field communication (NFC) module, a radio frequency identification (RFID) module, an audio sync module, an electric field communication (EFC) module, a human body communication (HBC) module, a visible light communication (VLC) module, a Bluetooth module, a proximity sensor, or a gyro sensor.

5. The first electronic device of claim 1, wherein the power supply module is configured to supply at least one of the power charged in the first electronic device or the power wirelessly supplied to the communication module through a power supply line of the communication module that is configured to receive power from the second electronic device.

6. The first electronic device of claim 5, wherein the power supply module applies a specific voltage to the power supply line of the communication module using at least one of the power charged in the first electronic device or the power wirelessly supplied.

7. The first electronic device of claim 5, wherein the power supply module comprises a wireless charging module coupled with the second electronic device to wirelessly receive power from the second electronic device.

8. The first electronic device of claim 1, further comprising an interface selection module configured to perform a determination of a protocol of the communication module in accordance with at least one of a user input or information being preset in the first electronic device.

9. The first electronic device of claim 8, wherein the interface selection module is configured to adjust setting of a voltage to be applied to a power supply line of the communication module based on a result of the determination of the protocol of the communication module.

10. The first electronic device of claim 1, wherein the communication module that is mounted on the first electronic device is adjacent to at least one surface of the first electronic device in at least one of a contact manner communication or in a non-contact manner communication.

11. The first electronic device of claim 1, wherein the communication module is mounted on a connection structure that is attachable to or detachable from at least one terminal exposed on an outer surface of the first electronic device.

12. The first electronic device of claim 1, wherein the communication module comprises at least a first communication module and a second communication module, each of which is configured to operate in one of a plurality of communication modes comprising at least one of a transmission mode or a reception mode.

13. The first electronic device of claim 12, further comprising a mode selection module configured to determine a communication mode of at least one of the first communication module or the second communication module based on a communication mode of a counterpart communication module of another device, which corresponds to at least one of the first communication module or the second communication module.

14. A method comprising:
performing a recognition of a second electronic device proximate to a first electronic device;
applying at least one of power charged in the first electronic device or power wirelessly supplied from the second electronic device as power for a communication module including a first communication module and a second communication module associated with the second electronic device, wherein the communication module associated with the second electronic device includes a magnetic module capable of being set to a first polarity and a second polarity, and the magnetic module is set to correspond to a polarity of a magnetic force between the first electronic device and the second electronic device;
wirelessly transmitting and receiving data to and from the second electronic device based on the applied at least one of the power;
determining communication modes of counterpart communication modules included in the second electronic device; and
controlling the first communication module and the second communication module to be operated in a different communication mode from a respective counterpart communication module of the second electronic device.

* * * * *